US009606515B2

(12) United States Patent
Hagita et al.

(10) Patent No.: US 9,606,515 B2
(45) Date of Patent: Mar. 28, 2017

(54) SATELLITE RADIO-CONTROLLED WATCH

(75) Inventors: Takushi Hagita, Tokorozawa (JP); Akira Kato, Sayama (JP); Akinari Takada, Mitaka (JP)

(73) Assignees: CITIZEN HOLDINGS CO., LTD., Tokyo (JP); CITIZEN WATCH CO., LTD., Tokyo (JP)

( * ) Notice: Subject to any disclaimer, the term of this patent is extended or adjusted under 35 U.S.C. 154(b) by 923 days.

(21) Appl. No.: 13/634,306

(22) PCT Filed: Mar. 22, 2011

(86) PCT No.: PCT/JP2011/056818
§ 371 (c)(1),
(2), (4) Date: Sep. 12, 2012

(87) PCT Pub. No.: WO2011/118573
PCT Pub. Date: Sep. 29, 2011

(65) Prior Publication Data
US 2013/0009816 A1    Jan. 10, 2013

(30) Foreign Application Priority Data

Mar. 26, 2010 (JP) .................................. 2010-073853
Mar. 26, 2010 (JP) .................................. 2010-073854

(51) Int. Cl.
*G01S 19/34* (2010.01)
*G04R 20/02* (2013.01)
(52) U.S. Cl.
CPC .............. *G04R 20/02* (2013.01); *G01S 19/34* (2013.01)
(58) Field of Classification Search
CPC .......... G01S 19/34; G04R 20/02; G04R 20/04
See application file for complete search history.

(56) References Cited

U.S. PATENT DOCUMENTS 5,627,548 A *  5/1997  Woo et al. ............... 342/357.57
5,905,460 A    5/1999  Odagiri et al.
(Continued)

FOREIGN PATENT DOCUMENTS

CN    101825866 A    9/2010
JP      7198876 A    8/1995
(Continued)

OTHER PUBLICATIONS

International Search Report of PCT/JP2011/056818 dated Jun. 14, 2011.
(Continued)

*Primary Examiner* — Gregory C Issing
(74) *Attorney, Agent, or Firm* — Sughrue Mion, PLLC

(57) ABSTRACT

Provided is a satellite radio-controlled watch, which is capable of holding back a receiving operation when in a posture that does not allow normal reception of a satellite signal, and is capable of performing a receiving operation under conditions varied to suit the type of reference information to be obtained. The satellite radio-controlled watch includes: a reception circuit (31) for receiving a satellite signal; and a controller (47) for sequentially detecting a received light amount of the satellite radio-controlled watch, calculating a received light variation which is an amount of change of the received light amount, and controlling the reception circuit (31) to start an operation of receiving the satellite signal, based on the received light variation. Alternatively, the controller (47) stores a condition for activating the reception circuit in order to obtain the reference information, in association with each piece of the reference information, and determines, when each piece of the reference information is obtained, whether or not the activation condition stored in association with each piece of the reference information is satisfied, and then controls the
(Continued)

reception circuit (31) to start an operation of receiving the satellite signal, based on a result of the determination.

9 Claims, 25 Drawing Sheets

(56) References Cited

U.S. PATENT DOCUMENTS

| | | | | |
|---|---|---|---|---|
| 8,520,473 | B2* | 8/2013 | Honda | G04R 20/04 368/14 |
| 2004/0176127 | A1* | 9/2004 | Ballantyne | G01S 19/34 455/552.1 |
| 2005/0157592 | A1* | 7/2005 | Nakamura | 368/47 |
| 2007/0210957 | A1* | 9/2007 | Brodie et al. | 342/357.06 |
| 2007/0230285 | A1 | 10/2007 | Nakagawa | |
| 2007/0239813 | A1* | 10/2007 | Pinder et al. | 708/270 |
| 2008/0030403 | A1* | 2/2008 | Honda | G01S 19/14 342/357.52 |
| 2009/0135674 | A1* | 5/2009 | Matsuzaki | G01S 19/14 368/14 |
| 2009/0180356 | A1 | 7/2009 | Fujisawa | |
| 2009/0189809 | A1* | 7/2009 | Baba | G01S 1/047 342/357.57 |
| 2010/0220555 | A1 | 9/2010 | Honda | |
| 2011/0063952 | A1 | 3/2011 | Baba | |

FOREIGN PATENT DOCUMENTS

| | | | | | |
|---|---|---|---|---|---|
| JP | 822422 | A | | 1/1996 | |
| JP | 1082875 | A | | 3/1998 | |
| JP | 10-325862 | A | | 12/1998 | |
| JP | 2000352583 | A | | 12/2000 | |
| JP | 20043929 | A | | 1/2004 | |
| JP | 200469679 | A | | 3/2004 | |
| JP | 2005-084038 | A | | 3/2005 | |
| JP | 2006-194697 | A | | 7/2006 | |
| JP | 2006322812 | A | | 11/2006 | |
| JP | 2008-039565 | A | | 2/2008 | |
| JP | 200914668 | A | | 1/2009 | |
| JP | EP 2063329 | A1 | * | 5/2009 | ............ G01S 19/14 |
| JP | 2009-168620 | A | | 7/2009 | |
| JP | 2009250801 | A | | 10/2009 | |
| JP | 2010-203856 | A | | 9/2010 | |
| WO | 03107100 | A1 | | 12/2003 | |
| WO | 2005031475 | A1 | | 4/2005 | |
| WO | WO 2009013725 | A1 | * | 1/2009 | ............ G01J 1/4204 |

OTHER PUBLICATIONS

Office Action issued in corresponding Japanese Patent Application No. 2010-073854 dated Oct. 29, 2013.

Communication dated Jul. 16, 2015 from the State Intellectual Property Office of the People's Republic of China in counterpart application No. 201280016355.9.

Communication dated May 25, 2016, from the European Patent Office in counterpart European Application No. 12763015.0.

Communication dated Jun. 1, 2016, from the European Patent Office in counterpart European Application No. 12765316.0.

* cited by examiner

FIG. 2
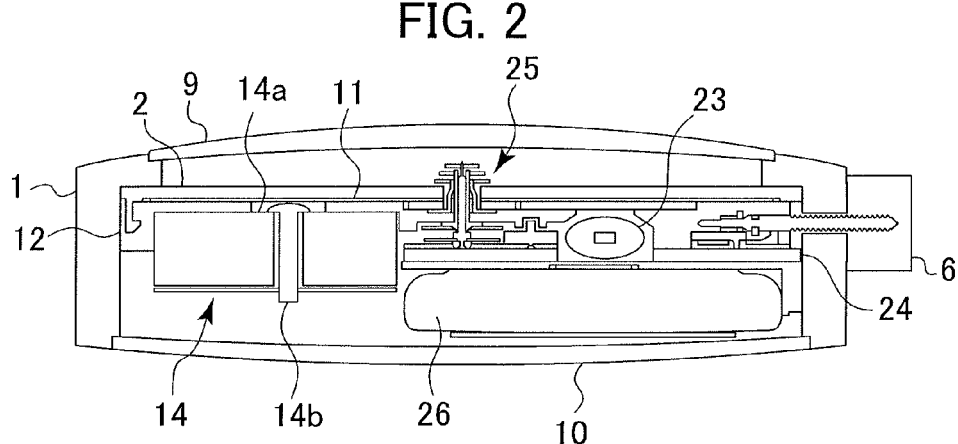
FIG. 3
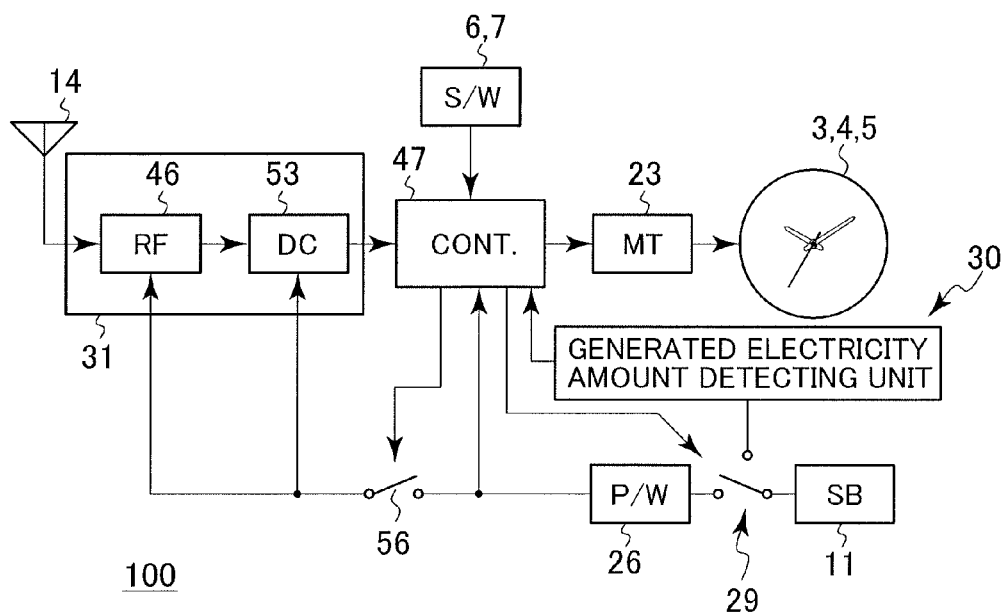
FIG. 4
|  | LAST RECEPTION VALUE | LAST RECEPTION DATE/TIME |
|---|---|---|
| TOW | 319488 | DECEMBER 2, 2009 16:44:48 |
| WN | 1560(536) | DECEMBER 2, 2009 16:44:48 |
| ΔtLS | 15 | DECEMBER 4, 2009 00:09:24 |
| WN LSF | 1512 | DECEMBER 4, 2009 00:09:24 |
| DN | 4 | DECEMBER 4, 2009 00:09:24 |
| ΔtLSF | 15 | DECEMBER 4, 2009 00:09:24 |

FIG. 5
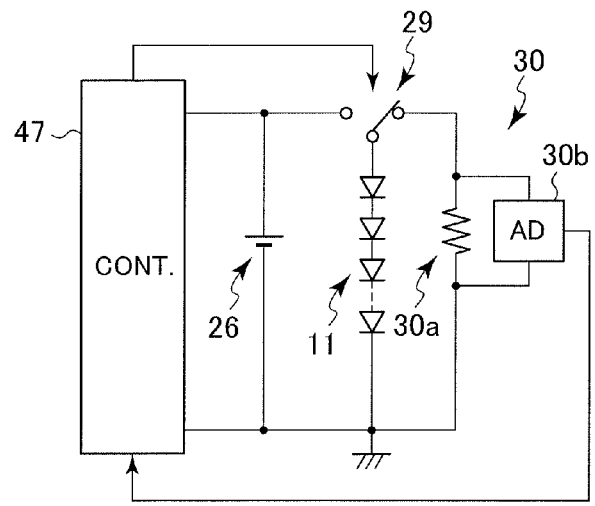
FIG. 6
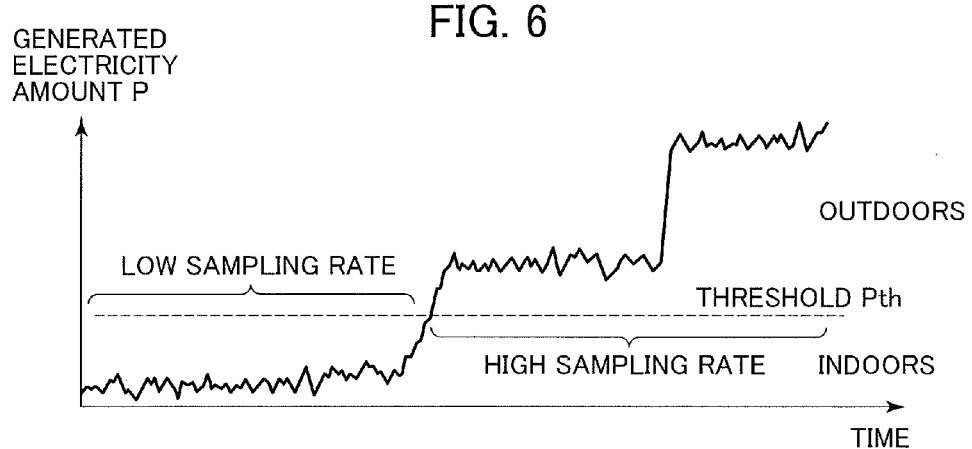
FIG. 7
| | | OUTDOORS (CLEAR DAY) | OUTDOORS (CLOUDY DAY) | INDOORS |
|---|---|---|---|---|
| WATCH FACE DIRECTION | UPWARD | 100000 | 32000 | 500 |
| | SIDEWARD | 50000 | 16000 | 250 |

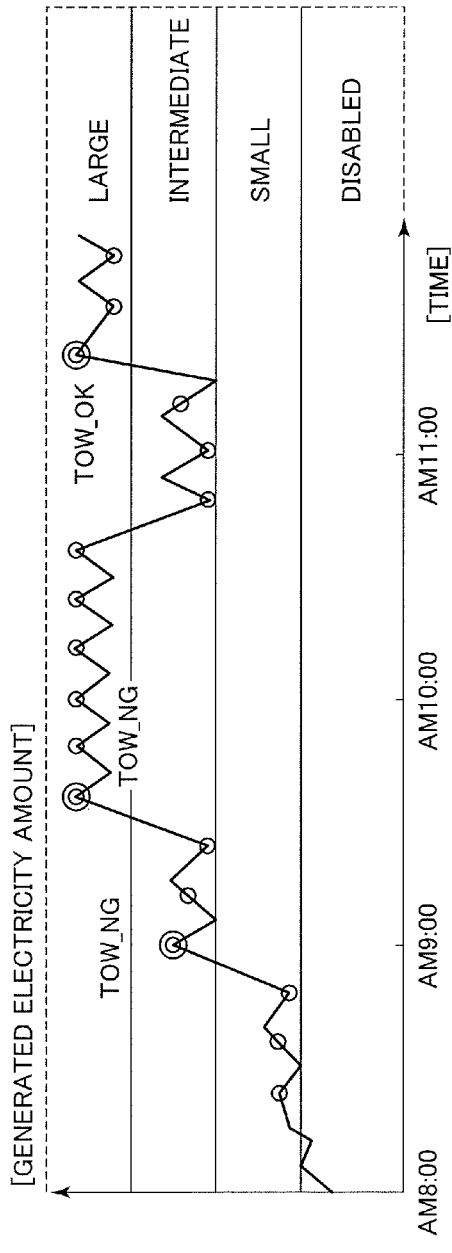

|  | LARGE | INTERMEDIATE | SMALL |
|---|---|---|---|
| TOW RECEPTION | 2 | 1 | 0 |
| LS RECEPTION | 1 | 0 | 0 |
| WN RECEPTION | 1 | 0 | 0 |

| | ACTIVATION CONDITION | |
|---|---|---|
| | RECEIVED LIGHT AMOUNT CONDITION | ACTIVATION COUNT CONDITION |
| TOW RECEPTION | LARGE, INTERMEDIATE, SMALL | LARGE: 5 TIMES, INTERMEDIATE: THREE TIMES, SMALL: ONCE |
| LS RECEPTION | LARGE, INTERMEDIATE | LARGE: TWICE, INTERMEDIATE: ONCE |
| WN RECEPTION | LARGE, INTERMEDIATE | LARGE: TWICE, INTERMEDIATE: ONCE |

SATELLITE RADIO-CONTROLLED WATCH

CROSS REFERENCE TO RELATED APPLICATIONS

This application is a National Stage of International Application No. PCT/JP2011/056818 filed Mar. 22, 2011, claiming priority based on Japanese Patent Application Nos. 2010-073853 filed Mar. 26, 2010 and JP 2010-073854 filed Mar. 26, 2010, the contents of all of which are incorporated herein by reference in their entirety.

TECHNICAL FIELD

The present invention relates to a satellite radio-controlled watch, and more particularly, to a satellite radio-controlled watch that adjusts time based on a satellite signal transmitted from a satellite.

BACKGROUND ART

Patent Literature 1 cited below discloses a Global Positioning System (GPS) watch which adjusts time based on a satellite signal from a GPS satellite. This watch determines whether the watch is indoors or outdoors by determining whether the amount of electricity generated by a solar panel exceeds a threshold, or whether the output amplitude of an acceleration sensor exceeds a threshold. The watch executes a satellite signal receiving operation only when determining that the watch is outdoors, in an attempt to reduce electric power consumption. The watch adjusts time based on a time of week (TOW) that is contained in a satellite signal. The time of week TOW indicates seconds elapsed since 0 o'clock last Sunday.

CITATION LIST

Patent Literature

[Patent Literature 1] JP 2008-039565 A

SUMMARY OF INVENTION

Technical Problem

However, a satellite signal from a GPS satellite is a short-wave signal, which makes it difficult for the GPS watch, even outdoors, to receive the satellite signal successfully unless its built-in antenna is directed toward the GPS satellite, in other words, upward. This problem is prominent particularly when the built-in antenna is housed in a metal casing of the watch. Specifically, when the built-in antenna is not directed upward, the built-in antenna and the metal watch casing partially overlap, or abut with each other when viewed from the satellite side, thereby making successful reception of a satellite signal with the built-in antenna difficult. Therefore, executing a satellite signal receiving operation depending solely on the determination about whether the watch is indoors or outdoors, as in the conventional technology described above, may unsatisfactorily reduce electric power consumption.

Further, adjusting time and date with precision based on a satellite signal actually requires obtaining from a satellite signal, in addition to the time of week TOW described above, a week number (WN) and a leap second (LS) offset $\Delta tLS$. The week number WN has been reset to 0 at 9 a.m., Aug. 22, 1999, and been incremented weekly by 1 ever since. The leap second offset $\Delta tLS$ indicates the deviation of a time output by an atomic clock of a GPS satellite from the Universal Time, Coordinated (UTC), and is updated irregularly. The time of week TOW is contained in all sub-frames 1 to 5 of a satellite signal and, inside each sub-frame, is contained in a hand-over word (HOW) located immediately after telemetry (TLM), which is a synchronization word. Receiving TOW is therefore completed in under one second and is relatively easy. The week number (WN), on the other hand, is contained only in the sub-frame 1 of a satellite signal and is located after HOW. Receiving WN therefore takes over one second at minimum. Moreover, the leap second offset $\Delta tLS$ is contained in the sub-frame 4 of a satellite signal only once out of twenty-five times the sub-frame 4 is transmitted, and is also transmitted after four to five seconds elapsed since TLM, which means that receiving $\Delta tLS$ takes five to six seconds. The pieces of information necessary to adjust time and date thus have different degrees of reception difficulty. On the other hand, the week number WN and the leap second offset $\Delta tLS$ are of course longer in update interval than the time of week TOW. Accordingly, receiving these pieces of reference information, the time of week TOW, the week number WN, and the leap second offset $\Delta tLS$, under the same condition wastes electric power in some cases.

The present invention has been made in view of the problem described above, and a first object of the present invention is to provide a satellite radio-controlled watch capable of reducing electric power consumption.

A second object of the present invention is to provide a satellite radio-controlled watch capable of holding back a receiving operation when in a posture that does not allow successful reception of a satellite signal.

A third object of the present invention is to provide a satellite radio-controlled watch capable of performing a receiving operation under conditions varied to suit the type of reference information to be obtained.

Solution to Problem

In order to solve the problem described above, according to one aspect of the present invention, there is provided a satellite radio-controlled watch which adjusts time based on a satellite signal transmitted from a satellite, including: reception means for receiving the satellite signal; received light amount detecting means for sequentially detecting a received light amount of the satellite radio-controlled watch; received light variation calculating means for calculating a received light variation which is an amount of change of the received light amount; and reception control means for controlling the reception means to start an operation of receiving the satellite signal, based on the received light variation.

Further, according to another aspect of the present invention, there is provided a satellite radio-controlled watch which adjusts time based on a satellite signal transmitted from a satellite, including: reception means for receiving the satellite signal; a sensor for detecting a posture of the satellite radio-controlled watch; and reception control means for controlling the reception means to start an operation of receiving the satellite signal, based on the posture of the satellite radio-controlled watch which is detected by the sensor.

Further, according to still another aspect of the present invention, there is provided a satellite radio-controlled watch which adjusts time and date based on a satellite signal that is transmitted from a satellite and contains a plurality of reference signals, including: reception means for receiving the satellite signal; activation condition storing means for storing a condition for activating the reception means in order to obtain the reference information, in association with each piece of the reference information; determining means for determining, when each piece of the reference information is obtained, whether or not the activation condition stored in association with each piece of the reference information is satisfied; and reception control means for controlling the reception means to start an operation of receiving the satellite signal, based on a result of the determination made by the determining means.

BRIEF DESCRIPTION OF DRAWINGS

FIG. 2 A sectional view taken along the line A-A of FIG. 1.

FIG. 3 A circuit configuration diagram of the satellite radio-controlled watch according to the embodiments of the present invention.

FIG. 4 A diagram schematically illustrating reference information which is stored in a controller.

FIG. 5 A diagram illustrating a circuit configuration example of a generated electricity amount detection unit.

FIG. 6 A diagram illustrating an example of changes in the amount of electricity generated by a solar battery.

FIG. 7 A diagram illustrating the amounts of light received on a watch face in different situations.

FIG. 24 A diagram illustrating activation conditions of a reception circuit in a satellite radio-controlled watch according to a ninth embodiment.

FIG. 25 A diagram illustrating changes in the amount of electricity generated by a solar battery and reference information reception timing.

DESCRIPTION OF EMBODIMENTS

Embodiments of the present invention will be described in detail below with reference to the drawings.

First Embodiment

Figure 1:
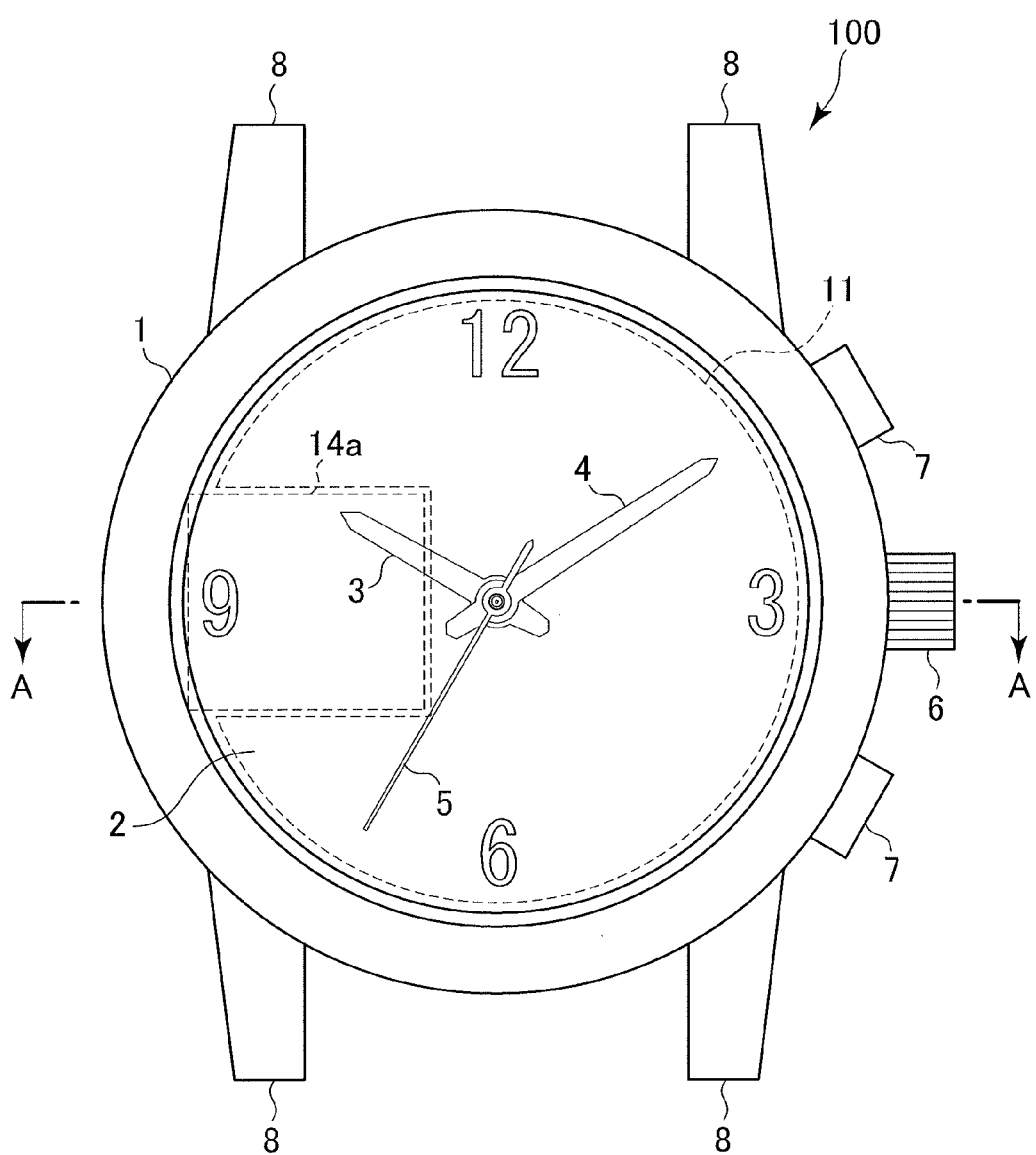
FIG. 1 A plan view of a satellite radio-controlled watch according to embodiments of the present invention.

FIG. 1 is a plan view illustrating a satellite radio-controlled watch 100 according to a first embodiment of the present invention. FIG. 1 illustrates a body 1, which is an outer covering (watch casing) of the satellite radio-controlled watch, a watch face 2, which is placed inside the body 1, and an hour hand 3, a minute hand 4, and a second hand 5, which are indicators indicating time. A crown 6 and buttons 7, which allow a user to perform various operations, are arranged on a side face of the body 1 on the three o'clock side. Band holding parts 8 for holding a band extend from side faces of the body 1 on the twelve o'clock side and the six o'clock side.

The design of the satellite radio-controlled watch 100 illustrated in FIG. 1 is an example. Other designs than the illustrated one can be employed: for example, the body 1 may have a square shape instead of a round shape, and the presence/absence, number, and arrangement of the crown 6 and the buttons 7 are optional. The indicator hands, which are the hour hand 3, the minute hand 4, and the second hand 5, three hands in total in this embodiment, are also not limited thereto. The second hand 5 may be omitted, or indicators for displaying the day of week, the time zone, whether or not daylight-saving time is in effect, a condition of radio-wave reception, remaining battery power, and various other items, a date display, and the like may be added.

Herein, the term satellite radio-controlled watch is used to refer to a wrist watch that has a function of receiving a satellite signal from a satellite such as a GPS satellite, which transmits a satellite signal containing information about date and time, and adjusting, based on the information about date and time contained in the satellite signal, namely, reference information, an internal time, which is information on time held inside the wrist watch.

FIG. 2 is a sectional view taken along the line A-A of FIG. 1. A glass cover 9 is attached to the body 1 so as to cover the watch face 2 of the satellite radio-controlled watch 100 and, on the opposite side from the glass cover 9, a rear cover 10 is attached to the body 1. The material of the glass cover 9 is a transparent material such as glass, and is non-magnetic and non-conductive. The materials of the body 1 and the rear cover 10 are not particularly limited, but are metal in this embodiment.

In the following description, a direction in which the glass cover 9 of the satellite radio-controlled watch 100 is placed (the upward direction in FIG. 2) is called a glass cover side, and a direction in which the rear cover 10 is placed (the downward direction in FIG. 2) is called a rear cover side.

A solar battery (photovoltaic panel) 11 is placed on the rear cover side of the watch face 2 and generates electricity from light incident on the glass cover side. The watch face 2 is therefore formed from a material that allows light beams to transmit to a certain degree. The watch face 2 in this embodiment is fixed to a base member 12 so as to sandwich the solar battery 11.

The base member 12 is made from a non-magnetic, non-conductive material such as synthetic resin, and supports various members including a patch antenna 14 and a gear mechanism 25 for driving the indicators. The patch antenna 14 is provided with a feeding pin 14b running in a thickness direction that pierces the patch antenna 14. The glass cover side of the patch antenna 14 constitutes a reception surface 14a where the radio waves from a satellite are received.

A radio-controlled watch which adjusts time using a time calibration signal transmitted from an earth station generally in the long-wave band often uses a so-called bar antenna, which is in the form of a coil wound around a magnetic coil made of ferrite, an amorphous alloy, or the like. The satellite radio-controlled watch 100 according to the present invention, on the other hand, uses the UHF band which is much higher in frequency to receive a signal transmitted from a satellite. The satellite radio-controlled watch 100 therefore uses the patch antenna 14 as a small-sized antenna suitable for receiving a signal in the UHF band.

A circuit board 24 is placed on the rear cover side of the base member 12 and a battery 26 is placed further on the rear cover side of the circuit board 24. The battery 26 in this embodiment is a chargeable secondary battery, here, a button-type, lithium ion battery. The battery 26 accumulates electric power generated by the solar battery 11. A motor 23 which is a drive source of the gear mechanism 25 is also attached to the circuit board 24.

The shape of the battery 26 is not limited to that of the button type and can be an arbitrary shape. The secondary battery used may also be batteries other than a lithium ion secondary battery, for example, a lithium ion capacitor or a nickel-metal hydride battery.

As illustrated in FIG. 2, the reception surface 14a of the patch antenna 14 is set up parallel to a reception surface of the solar battery 11, and both are directed toward the glass cover side. As illustrated in FIG. 1, the solar battery 11 has a substantially circular shape, and the circumference of the solar battery 11 is partially cut out to form a rectangular notch. The patch antenna 14 is placed in the notch. The reception surface 14a of the patch antenna 14 and the reception surface of the solar battery 11 are both directly opposed to the rear surface of the watch face 2. In this embodiment, the amount of electricity generated by the solar battery 11 is the amount of light received by the satellite radio-controlled watch 100. This received light amount is used as a basis for determining whether or not the reception surface 14a of the patch antenna 14 is directed skyward.

FIG. 3 is a circuit configuration diagram of the satellite radio-controlled watch 100 according to the first embodiment. Most of these circuit components are arranged on the circuit board 24. A satellite signal received by the patch antenna 14 is converted by a high-frequency circuit 46 into a baseband signal. A decoder circuit 53 extracts, from the signal, information about time, specifically, information indicating time and date, and the extracted information is handed over to a controller 47. The high-frequency circuit 46 and the decoder circuit 53 constitute a reception circuit 31. The controller 47 is a microcomputer with a driver of the motor 23, volatile and non-volatile memories, a clock circuit, and various AD converters built inside. Various types of control are executed by a program that is stored in the non-volatile memory.

The volatile memory built in the controller 47 stores reference information for adjusting date and time which is illustrated in FIG. 4. These pieces of reference information are extracted from a satellite signal. First, a time of week TOW indicates seconds elapsed since 0 o'clock last Sunday. The time of week TOW is contained in all sub-frames 1 to 5 and, inside each sub-frame, is contained in a hand-over word (HOW) located immediately after telemetry (TLM), which is a synchronization word. A week number WN has been reset to 0 at 9 a.m., Aug. 22, 1999, and been incremented weekly by 1 ever since. The week number (WN) is contained only in the sub-frame 1 of a satellite signal and is located after HOW. A leap second offset ΔtLS indicates the deviation of a time output by an atomic clock of a GPS satellite from the Universal Time, Coordinated (UTC), and is updated irregularly. The leap second offset ΔtLS is contained in the sub-frame 4 of a satellite signal only once (the sub-frame 4, page 18) out of twenty-five times (pages 1 to 25) the sub-frame 4 is transmitted, and is transmitted after four to five seconds have elapsed since TLM. The sub-frames 1 to 5 each take six seconds to be transmitted, which means that the leap second offset ΔtLS is transmitted every 12.5 minutes. A leap second update week WNLSF is the week number of a week in which an update of the leap second offset ΔtLS is scheduled, and is transmitted immediately after the leap second offset ΔtLS. A leap second update date DN is the number of days elapsed since last Sunday until a day when an update of the leap second offset ΔtLS is scheduled, and is transmitted immediately after the leap second update week WNLSF. An updated leap second offset ΔtLSF is an updated leap second offset value, and is transmitted immediately after the leap second update date DN. The controller 47 extracts these reference information items from a satellite signal, saves in the volatile memory, and stores dates/times at which the reference information is stored in association with the saved reference information (see FIG. 4). The reception dates/times are set in accordance with, for example, the output of the built-in clock circuit.

Based on the thus saved reference information, the controller 47 adjusts an internal time (including the current time and date), which is time information kept by the internal clock circuit, and drives the motor 23 based on the internal time. Rotative power generated by the motor 23 is transmitted to the indicator hands (the hour hand 3, the minute hand 4, and the second hand 5) via a gear train to display time.

The solar battery 11 is connected to the battery 26 via a switch 29. While electrical connection between the solar battery 11 and the battery 26 is established by the switch 29 under instruction from the controller 47, electric power generated by the solar battery 11 is accumulated in the battery 26. The battery 26 supplies electric power to the high-frequency circuit 46, the decoder circuit 53, and the controller 47. The solar battery 11 is also connected to a generated electricity amount detecting unit 30 via the switch 29. While electrical connection between the solar battery 11 and the generated electricity amount detecting unit 30 is established by the switch 29 under instruction from the controller 47, a current generated by the solar battery 11 flows into the generated electricity amount detecting unit 30. The generated electricity amount detecting unit 30 converts this current into a voltage, further converts this voltage into a digital value, and supplies the digital value to the controller 47. A switch 56 is a switch for switching on/off electric power supply to the reception circuit 31, namely, the high-frequency circuit 46 and the decoder circuit 53, and is controlled by the controller 47. Because the high-frequency circuit 46 which operates at a high frequency and the decoder circuit 53 consume large electric power, the controller 47 turns on the switch 56 to allow the reception circuit 31, namely, the high-frequency circuit 46 and the decoder circuit 53 to operate, only when a satellite signal is received, and turns off the switch 56 for the rest of the time to reduce electric power consumption.

The reception of a satellite signal may be executed when a user requests via input means such as the crown 6 or the buttons 7, or a predetermined time arrives, and may also be executed based on the length of time elapsed since the last adjustment of time, or on the amount of electricity generated by the solar battery 11 or other types of information indicating the surrounding environment of the radio-controlled watch 100. The controller 47 switches on/off the switch 29 at an arbitrary time to connect a terminal of the solar battery 11 to the generated electricity amount detecting unit 30, controls the generated electricity amount detecting unit 30 to generate a digital value indicating the amount of electricity generated, and obtains this digital value. FIG. 5 illustrates a circuit configuration example of the generated electricity amount detecting unit 30. The current value of the solar battery 11 fluctuates greatly depending on the amount of light received by the solar battery 11. The generated electricity amount detecting unit 30 illustrated in FIG. 5 therefore includes a resistor 30a, which is connected in parallel to the solar battery 11 and through which a current generated by the solar battery 11 flows, and an AD converter 30b, which converts a voltage between the two terminals of the resistor 30a into a digital value. The digital value generated by the AD converter 30b indicates the amount of electricity generated, namely, the amount of light received by the solar battery 11, and is input to the controller 47.

A concrete description is given below on processing of controlling satellite signal reception timing based on the amount of electricity generated by the solar battery 11. FIG. 6 illustrates an example of the transition of a generated electricity amount P in the solar battery 11. The transition of the generated electricity amount P illustrated in FIG. 6 is observed when the satellite radio-controlled watch 100 worn on an arm is moved from indoors to outdoors and then the arm is lifted so as to direct the watch face 2 toward the sun. As illustrated in FIG. 7, the amount of light received outdoors on the watch face is generally several dozen times the amount of light received indoors or larger (each numerical value in FIG. 7 is in lux) irrespective of whether the weather is clear or cloudy. On the other hand, the amount of light detected when the watch face is directed upward is only about twice the amount of light detected when the watch face is not directed upward. Accordingly, if a threshold Pth of the generated electricity amount P of the solar battery 11 is set to a value between the generated electricity amount P that is observed when the solar battery 11 is indoors and is directed toward a light fixture and the generated electricity amount P that is observed when the solar battery 11 is outdoors and is not directed upward, in other words, is not directed toward the sun, whether the solar battery 11 is indoors or outdoors can be determined by comparing the threshold and the currently generated electricity amount P. In the first embodiment, whether the watch is indoors or outdoors is determined first by determining whether or not the generated electricity amount P exceeds the threshold Pth. When it is determined that the satellite radio-controlled watch 100 is located indoors, the interval for obtaining the generated electricity amount P is set to a time period T1. When it is determined that the satellite radio-controlled watch 100 is located outdoors, on the other hand, the interval for obtaining the generated electricity amount P is set to a time period T2 (T2<T1). The electric power consumption to obtain the generated electricity amount P is reduced in this manner. In addition, when the generated electricity amount P is obtained, the switch 29 is switched so as to disconnect the solar battery 11 and the battery 26 and to connect the solar battery 11 and the generated electricity amount detecting unit 30 as described above. The charging of the battery 26 is thus stopped while the generated electricity amount P is obtained. This is compensated by increasing the charging efficiency in this embodiment, where the interval for obtaining the generated electricity amount P is set long when the generated electricity amount P is small, to thereby provide many occasions for charging the battery 26. The time period T1 is desirably set to a value greater than the length of time necessary to move the worn satellite radio-controlled watch 100 from indoors to outdoors (for example, twenty seconds). The time period T2 is desirably set to a value greater than the length of time necessary to lift the arm wearing the satellite radio-controlled watch 100 so that the watch face 2 of the satellite radio-controlled watch 100 is directed upward (for example, about one second).

Figure 8:
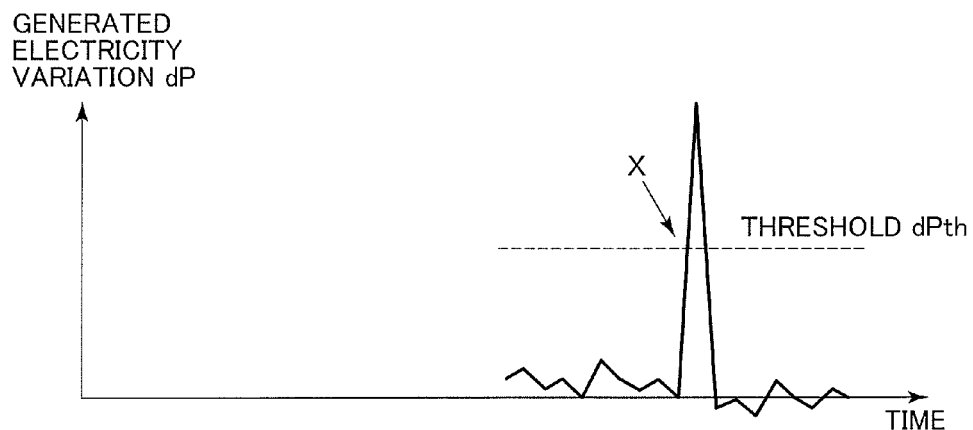
FIG. 8 A diagram illustrating an example of changes in generated electricity amount.

When it is determined that the satellite radio-controlled watch 100 is located outdoors, the calculation of the amount of change in generated electricity amount P, namely, a generated electricity variation dP, is started. Whether or not the generated electricity variation dP exceeds a threshold dPth is determined to determine whether or not the watch face 2 is directed upward. FIG. 8 illustrates an example of the transition of the generated electricity variation dP in the solar battery 11. The axis of abscissa (time axis) of FIG. 8 corresponds to the axis of abscissa (time axis) of FIG. 5. If the threshold dPth is set to a value approximately half the difference between the generated electricity amount P that is the average for the case where the watch is outdoors and the watch face 2 is not directed upward and the generated electricity amount P that is the average for the case where the watch is outdoors and the watch face 2 is directed upward, time X illustrated in FIG. 8 at which the generated electricity variation dP exceeds the threshold dPth can be determined as a time at which the watch face 2 is directed upward outdoors. The threshold dPth can be a fixed value. The generated electricity variation dP takes a value approximately the same as the generated electricity amount P that is observed immediately before the watch face 2 is directed upward, because directing the watch face 2 upward increases the generated electricity amount P by about two times. The threshold dPth may therefore be obtained as the exact generated electricity amount P that is observed immediately before the watch face 2 is directed upward, or by multiplying a moving average (for example, a moving average taken over five to ten times) of the generated electricity amount P by a given value (for example, around 0.5). This way, the threshold dPth can be set to suit the weather.

Figure 9:
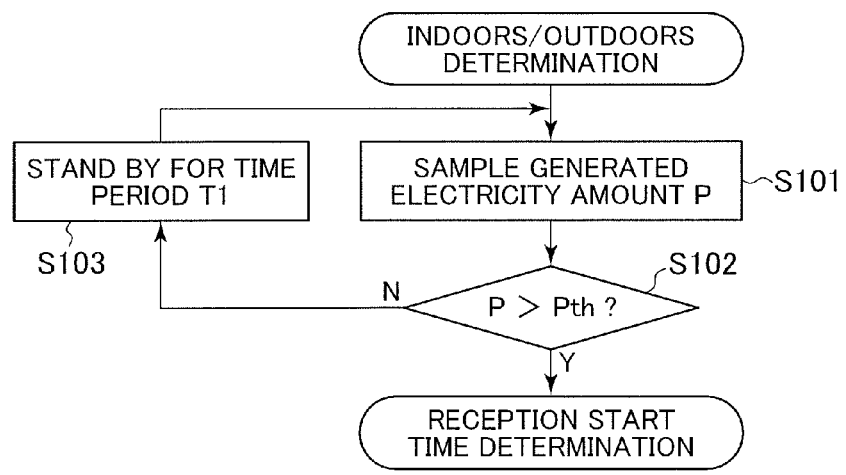
FIG. 9 A flow chart illustrating indoors/outdoors determining processing.

FIG. 9 is a flow chart illustrating indoors/outdoors determining processing which is executed by the controller 47. This satellite radio-controlled watch 100 regularly (for example, 0 p.m. every day) checks expiration dates of the various types of reference information which are extracted from a satellite signal and saved in the manner illustrated in FIG. 4, and newly obtains a piece of reference information that has expired. For example, the time of week TOW is determined as expired when forty-eight hours have elapsed since the last reception date/time. In the case where an internal clock runs fast or slow by fifteen seconds per month, approximately one second of speeding or slowing may occur in forty-eight hours. By determining the time of week TOW as expired after forty-eight hours and obtaining TOW anew, the speeding or slowing of the internal clock can continually be kept within about one second. The week number WN is determined as expired when one week, for example, has elapsed since the last reception date/time. The leap second offset ΔtLS, the leap second update week WNLSF, the leap second update date DN, and the updated leap second offset ΔtLSF are determined as expired when six months have elapsed since the last reception date/time, or when the month of a date identified by the already stored leap second update week WNLSF and leap second update date DN turns to the next month. In the case where one of the pieces of information is found to have expired, the controller 47 executes indoors/outdoors determining processing. In this processing, the controller 47 first samples the generated electricity amount P (S101). Then whether or not the generated electricity amount P exceeds the threshold Pth is determined (S102). In the case where the generated electricity amount P does not exceed the threshold Pth, the controller 47 waits until the time period T1 elapses from the last sampling time (S103), and then samples the generated electricity amount P again (S101). In the case where the generated electricity amount P exceeds the threshold Pth, the controller 47 determines that the watch has been moved to the outdoors and proceeds to reception start time determining processing.

Figure 10:
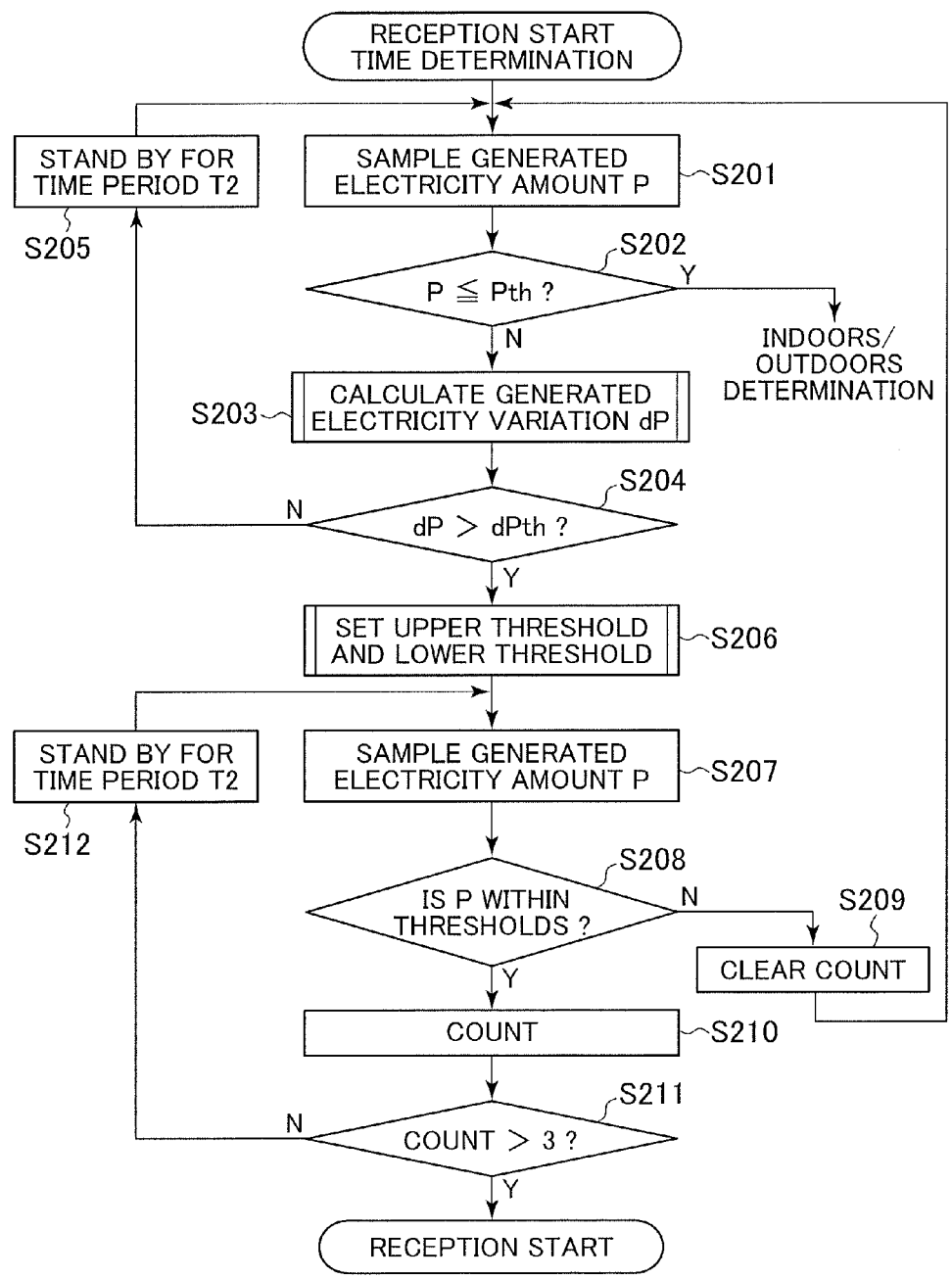
FIG. 10 A flow chart illustrating reception start time determining processing according to a first embodiment.

FIG. 10 is a flowchart illustrating the reception start time determining processing which is executed by the controller 47. In this processing, the controller 47 first samples the generated electricity amount P (S201). Whether or not the generated electricity amount P is equal to or less than the threshold Pth is determined next (S202). In the case where the generated electricity amount P is equal to or less than the threshold Pth, the controller 47 determines that the watch has been moved indoors, and returns to the indoors/outdoors determining processing of FIG. 9. In the case where the generated electricity amount P exceeds the threshold Pth, on the other hand, the controller 47 calculates the generated electricity variation dP (S203). Whether or not the calculated generated electricity variation dP exceeds the threshold dPth is determined next (S204). The threshold dPth may be a fixed value or the generated electricity amount P obtained in S201, or may be calculated from the moving average of the obtained generated electricity amount P as described above. In the case where the threshold dPth is not exceeded, the controller 47 waits until the time period T2 elapses from the last sampling time (S205), and then samples the generated electricity amount P again (S201).

Figure 11:
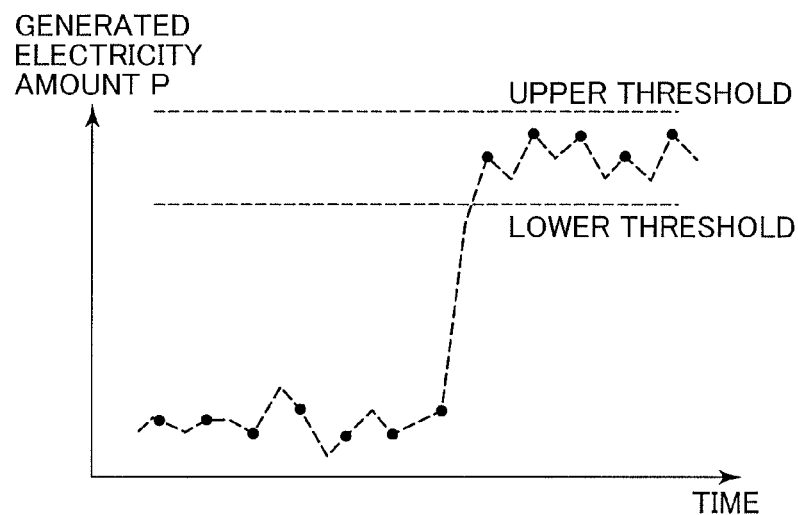
FIG. 11 A diagram illustrating a method of evaluating the stability of the generated electricity amount.

In the case where the generated electricity variation dP exceeds the threshold dPth, on the other hand, the controller 47 determines that the watch face 2 has been directed upward, and subsequently checks the stability of the amount of light received. Specifically, an upper limit value and lower limit value of the generated electricity amount P are set first (S206). For example, as illustrated in FIG. 11, a value obtained by increasing the generated electricity amount P that is sampled last time by a given proportion (e.g., 15%) is set as the upper limit value, and a value obtained by reducing this last sampled amount by a given proportion (e.g., 15%) is set as the lower limit value. The controller 47 next samples the generated electricity amount P again (S207) and determines whether or not this generated electricity amount P falls between the upper limit value and lower limit value set in S206 (S208). In the case where the sampled amount falls between the limited values, the controller 47 increments a counter n, which is a variable having an initial value of 0, by 1 (S210) and determines whether or not the counter n exceeds 3 (S211). In the case where the counter n exceeds 3, the controller 47 determines that the amount of light received is stable, switches the switch 56 on, and allows the high-frequency circuit 46 and the decoder circuit 53 to start obtaining the reference information.

In the case where the counter n does not exceed 3, on the other hand, the controller 47 waits until the time period T2 elapses from the last sampling of the generated electricity amount P in S207 (S212), and then returns to S207 to execute the subsequent processing steps. When it is determined in S208 that the generated electricity amount P does not fall between the upper limit value and lower limit value set in S206, the controller 47 initializes the counter n to 0 (S209) and then returns to S201 to execute the subsequent processing steps. Although whether or not the counter n exceeds 3 is determined in S211, the value "3" is given as an example and it should be understood that values other than 3 can be set.

According to the control described above, the generated electricity amount P is sampled at a low sampling rate and the reception start time determining processing of FIG. 10 is not executed until it is determined through the indoors/outdoors determining processing that the watch has been moved to the outdoors, and electric power consumption is thus reduced. In addition, in the reception start time determining processing, the high-frequency circuit 46 and the decoder circuit 53 are allowed to operate only when the generated electricity variation dP, which is the amount of change in generated electricity amount P, exceeds the threshold dPth and subsequently the generated electricity amount P that falls within a given range of value is sampled a given number of times in succession. In short, the satellite signal reception operation is started only when it is deduced that the watch face 2 of the satellite radio-controlled watch 100 stays directed upward. The high-frequency circuit 46 and the decoder circuit 53 are thus allowed to operate only when there is a strong possibility that the patch antenna 14 can receive a satellite signal properly, thereby preventing wasteful electric power consumption.

Second Embodiment

Figure 12:
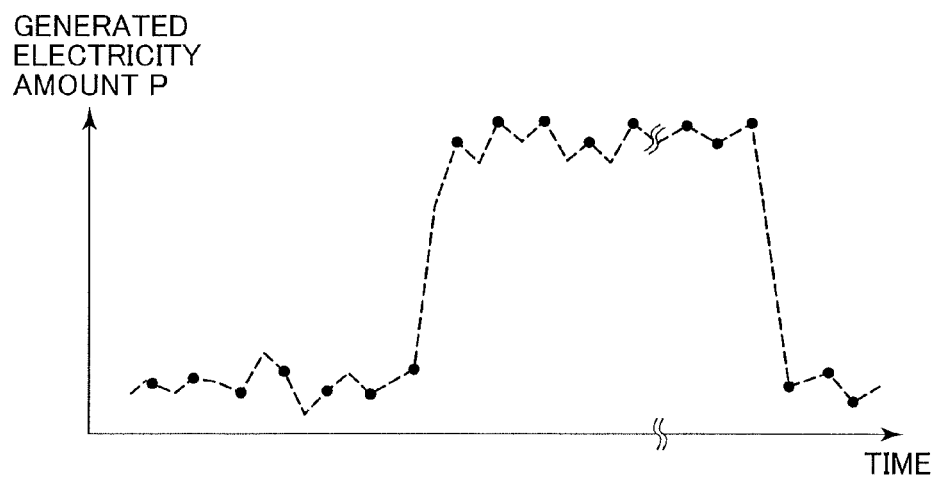
FIG. 12 A diagram illustrating an example of changes in generated electricity amount.
Figure 13:
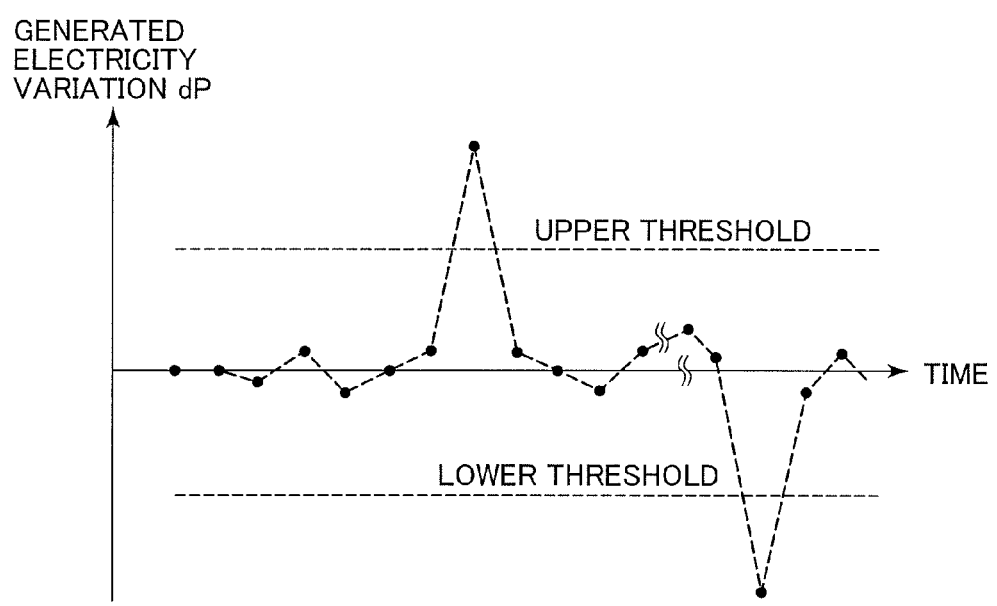
FIG. 13 A diagram illustrating an example of changes in generated electricity variation.

FIG. 12 illustrates an example of the transition of the generated electricity amount P that is observed when the satellite radio-controlled watch 100 has been brought to the outdoors, and FIG. 13 illustrates the transition of the generated electricity variation dP that corresponds to the transition of the generated electricity amount P of FIG. 12. This example is of a case where a user lifts an arm so as to direct the watch face 2 upward and, after a given period of time elapses, returns the arm to their side. The generated electricity amount P in this case increases rapidly once and then drops rapidly at the same inclination. The generated electricity variation dP, on the other hand, changes in an upward wedge pattern once and then changes in a downward wedge pattern. It can be estimated in this case that the watch face 2 stays directed upward until the generated electricity variation dP becomes lower than a threshold −dPth after exceeding the threshold dPth. Accordingly, the reception operation may be started by determining that the amount of light received is stable when the length of time in which the user lifts an arm so as to direct the watch face 2 upward and then returns the arm to their side is equal to or longer than a given period of time.

Figure 14:
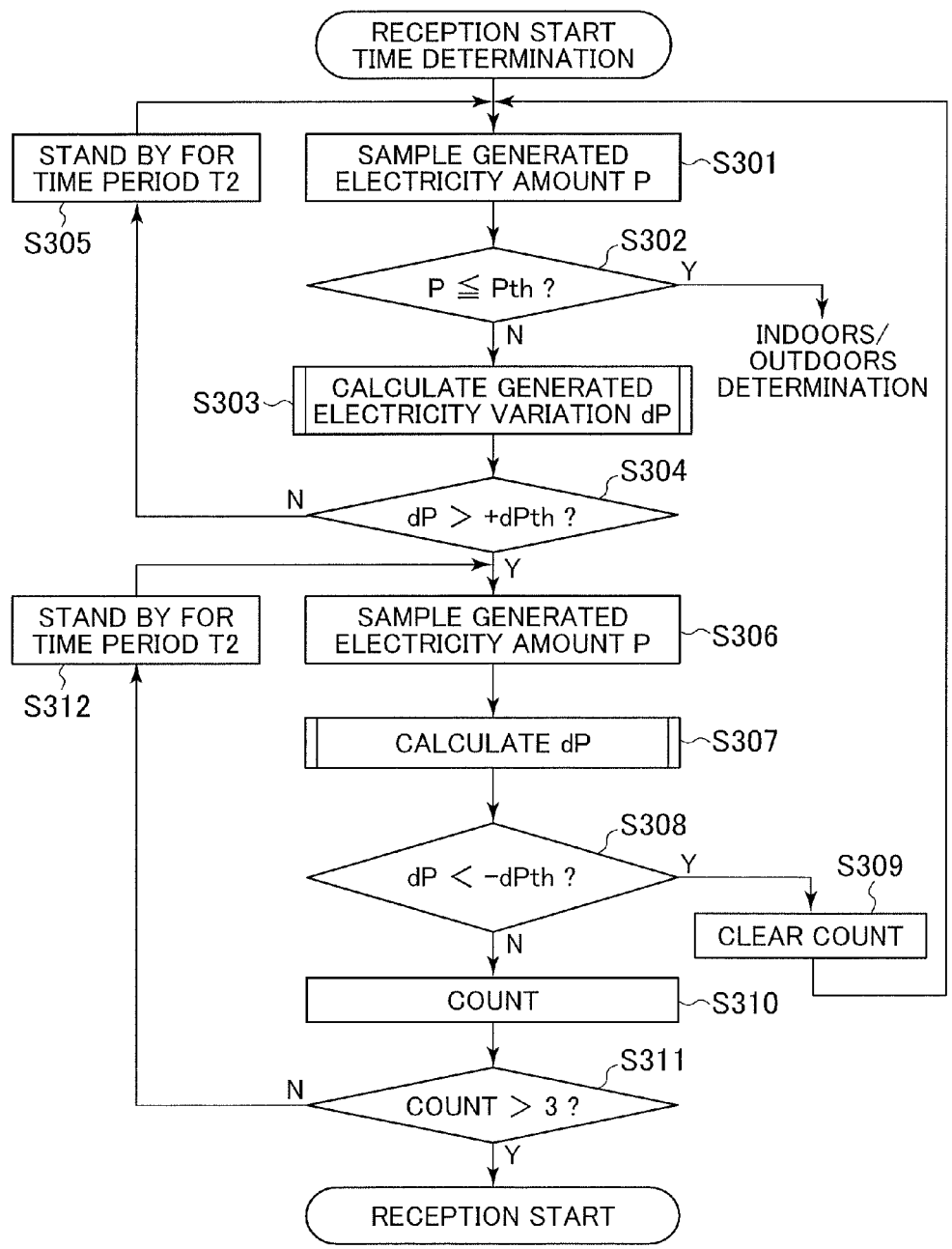
FIG. 14 A flow chart illustrating reception start time determining processing according to a second embodiment.

FIG. 14 is a flow chart illustrating a modification example of the reception start time determining processing of FIG. 10. In this processing, the controller 47 first samples the generated electricity amount P (S301). Whether or not the generated electricity amount P is equal to or less than the threshold Pth is determined next (S302). In the case where the generated electricity amount P is equal to or less than the threshold Pth, the controller 47 determines that the watch has been moved indoors, and returns to the indoors/outdoors determining processing of FIG. 9. In the case where the generated electricity amount P exceeds the threshold Pth, on the other hand, the controller 47 calculates the generated electricity variation dP (S303). Whether or not the calculated generated electricity variation dP exceeds a threshold +dPth is determined next (S304). The threshold dPth may be a fixed value or the generated electricity amount P obtained in S301, or may be calculated from the moving average of the obtained generated electricity amount P as described above. In the case where the threshold +dPth is not exceeded, the controller 47 waits until the time period T2 elapses from the last sampling time (S305), and then samples the generated electricity amount P again (S301).

In the case where the generated electricity variation dP exceeds the threshold +dPth, on the other hand, the controller 47 determines that the watch face 2 has been directed upward, and subsequently checks the stability of the amount of light received. Specifically, the generated electricity amount P is sampled again (S306) and the generated electricity variation dP is also calculated (S307). The controller 47 then determines whether or not the generated electricity variation dP is less than −dP (S308). In the case where the generated electricity variation dP is equal to or more than −dP, the controller 47 increments the counter n, which is a variable having an initial value of 0, by 1 (S310) and determines whether or not the counter n exceeds 3 (S311). In the case where the counter n exceeds 3, the controller 47 determines that the amount of light received is stable, switches the switch 56 on, and allows the high-frequency circuit 46 and the decoder circuit 53 to start obtaining the reference information.

In the case where the counter n does not exceed 3, on the other hand, the controller 47 waits until the time period T2 elapses from the last sampling of the generated electricity amount P in S306 (S312), and then returns to S306 to execute the subsequent processing steps. When the generated electricity variation dP is less than −dP in S308, the controller 47 initializes the counter n to 0 (S309) and then returns to S301 to execute the subsequent processing steps. Although whether or not the counter n exceeds 3 is determined in S311, the value "3" is given as an example and it should be understood that values other than 3 can be set.

In the manner described above, too, wasteful electric power consumption can be prevented by operating the high-frequency circuit 46 and the decoder circuit 53 in a situation where the reference information is likely to be obtained successfully.

Third Embodiment

An average of the generated electricity amounts P that are observed before the watch face 2 is directed upward may be used as a basis for determining a time at which the watch face 2 goes back to being directed in directions other than the upward direction.

Figure 15:
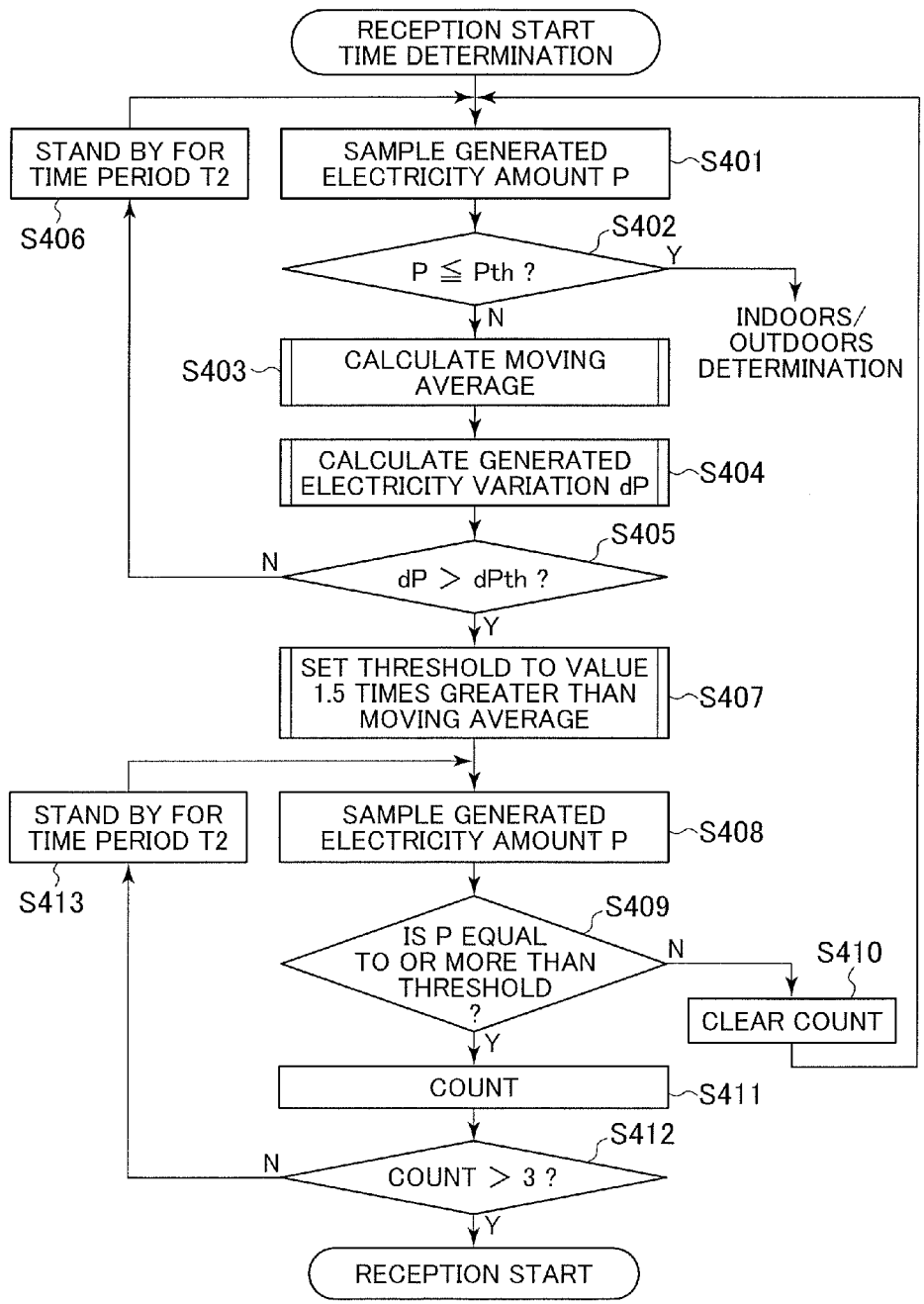
FIG. 15 A flow chart illustrating reception start time determining processing according to a third embodiment.

FIG. 15 is a flow chart illustrating another modification example of the reception start time determining processing of FIG. 10. In this processing, the controller 47 first samples the generated electricity amount P (S401). Whether or not the generated electricity amount P is equal to or less than the threshold Pth is determined next (S402). In the case where the generated electricity amount P is equal to or less than the threshold Pth, the controller 47 determines that the watch has been moved indoors, and returns to the indoors/outdoors determining processing of FIG. 9. In the case where the generated electricity amount P exceeds the threshold Pth, on the other hand, the controller 47 calculates the moving average of the generated electricity amount P (S403). The moving average is the average of the generated electricity amounts P of the preceding n times. The value of n here can be 20 to 30, for example. The controller 47 also calculates the generated electricity variation dP (S404). Whether or not the calculated generated electricity variation dP exceeds the threshold dPth is determined next (S405). The threshold dPth may be a fixed value or the generated electricity amount P obtained in S401, or may be calculated from the moving average of the obtained generated electricity amount P as described above. In the case where the threshold dPth is not exceeded, the controller 47 waits until the time period T2 elapses from the last sampling time (S406), and then samples the generated electricity amount P again (S401).

In the case where the generated electricity variation dP exceeds the threshold dPth, on the other hand, the controller 47 determines that the watch face 2 has been directed upward, and subsequently checks the stability of the amount of light received. Specifically, the threshold Pth is obtained first by multiplying the moving average that has been calculated in S403 by a given value (S407). The given value is, for example, about 1.5. A value obtained by multiplying the moving average of the generated electricity amount P by a given value (about 1.5) can be used as a basis for determining whether or not the watch face 2 is directed upward because, as illustrated in FIG. 7, the amount of light received varies depending on the direction of the watch face 2 in a substantially constant proportion irrespective of the weather. Thereafter, the controller 47 samples the generated electricity amount P again (S408) and determines whether or not this generated electricity amount P is equal to or more than the threshold Pth obtained in S407 (S409). In the case where the generated electricity amount P is equal to or more than the threshold Pth, the controller 47 increments the counter n, which is a variable having an initial value of 0, by 1 (S411) and determines whether or not the counter n exceeds 3 (S412). In the case where the counter n exceeds 3, the controller 47 determines that the amount of light received is stable, switches the switch 56 on, and allows the high-frequency circuit 46 and the decoder circuit 53 to start obtaining the reference information.

In the case where the counter n does not exceed 3, on the other hand, the controller 47 waits until the time period T2 elapses from the last sampling of the generated electricity amount P in S408 (S413), and then returns to S408 to execute the subsequent processing steps. When it is determined in S409 that the generated electricity amount P is less than the threshold Pth obtained in S407, the controller 47 initializes the counter n to 0 (S410) and then returns to S401 to execute the subsequent processing steps. Although whether or not the counter n exceeds 3 is determined in S412, the value "3" is given as an example and it should be understood that values other than 3 can be set.

In the manner described above, too, the high-frequency circuit 46 and the decoder circuit 53 can be allowed to operate in a situation where the reference information is likely to be obtained successfully. In particular, the stability of the amount of light received can be determined regardless of the weather because the moving average of the generated electricity amount P is calculated and a value obtained by multiplying this moving average by a given value is used as a basis for determining the stability of the received light amount.

Fourth Embodiment

An integration value of the generated electricity variation dP may be used as a basis for determining a time at which the watch face 2 goes back to being directed in directions other than the upward direction.

Figure 16:
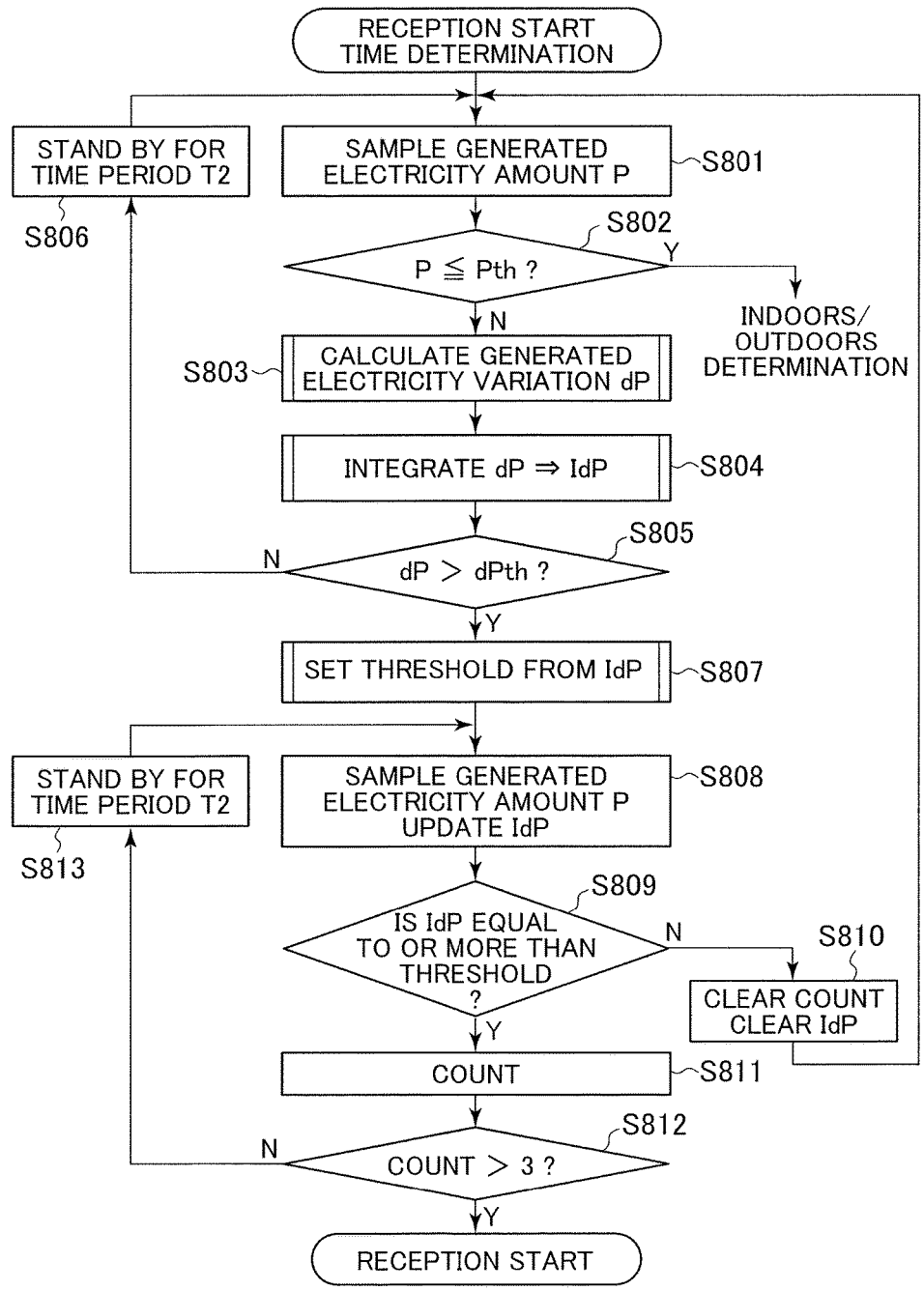
FIG. 16 A flow chart illustrating reception start time determining processing according to a fourth embodiment.

FIG. 16 is a flow chart illustrating another modification example of the reception start time determining processing of FIG. 10. In this processing, the controller 47 first samples the generated electricity amount P (S801). Whether or not the generated electricity amount P is equal to or less than the threshold Pth is determined next (S802). In the case where the generated electricity amount P is equal to or less than the threshold Pth, the controller 47 determines that the watch has been moved indoors, and returns to the indoors/outdoors determining processing of FIG. 9. In the case where the generated electricity amount P exceeds the threshold Pth, on the other hand, the controller 47 calculates the generated electricity variation dP (S803). The controller 47 further calculates IdP, which is an integration value of the generated electricity variation dP (S804). To describe in more detail, the generated electricity variation dP calculated in S803 is added to the already stored integration value IdP, and the resultant value is stored anew as the integration value IdP. Whether or not the calculated generated electricity variation dP exceeds the threshold dPth is determined next (S805). The threshold dPth may be a fixed value or the generated electricity amount P obtained in S801, or may be calculated from the moving average of the obtained generated electricity amount P as described above. In the case where the threshold dPth is not exceeded, the controller 47 waits until the time period T2 elapses from the last sampling time (S806), and then samples the generated electricity amount P again (S801).

In the case where the generated electricity variation dP exceeds the threshold dPth, on the other hand, the controller 47 determines that the watch face 2 has been directed upward, and subsequently checks the stability of the amount of light received. Specifically, a threshold of the integration value IdP is obtained first by multiplying the already stored integration value IdP by a given value (S807). The given value is, for example, about 0.5. Thereafter, the generated electricity amount P is sampled again and the integration value IdP is updated (S808). To describe in more detail, the integration value IdP is updated by calculating the generated electricity variation dP and adding this generated electricity variation dP to the already stored integration value IdP. Whether or not the integration value IdP is equal to or more than the threshold obtained in S807 is determined next (S809). In the case where IdP is equal to or more than the obtained threshold, the controller 47 increments the counter n, which is a variable having an initial value of 0, by 1 (S811) and determines whether or not the counter n exceeds 3 (S812). In the case where the counter n exceeds 3, the controller 47 determines that the amount of light received is stable, switches the switch 56 on, and allows the high-frequency circuit 46 and the decoder circuit 53 to start obtaining the reference information.

In the case where the counter n does not exceed 3, on the other hand, the controller 47 waits until the time period T2 elapses from the last sampling of the generated electricity amount P in S808 (S813), and then returns to S808 to execute the subsequent processing steps. When it is determined in S809 that the integration value IdP is less than the threshold obtained in S807, the controller 47 initializes the counter n to 0 and also initializes the stored integration value IdP to 0 (S810). The controller 47 then returns to S801 to execute the subsequent processing steps. Although whether or not the counter n exceeds 3 is determined in S812, the value "3" is given as an example and it should be understood that values other than 3 can be set.

In the manner described above, too, the high-frequency circuit 46 and the decoder circuit 53 can be allowed to operate in a situation where the reference information is likely to be obtained successfully. In particular, the stability of the amount of light received can be determined regardless of the weather with easy processing because the integration value IdP is used as a basis for determining the stability of the received light amount.

Fifth Embodiment

Conditions for starting the reception operation may be varied depending on the type of reference information to be obtained from a satellite signal. As described above, the time of week TOW is contained in HOW located immediately after TLM, which is a synchronization word, and the week number WN is located after HOW. These pieces of reference information, TOW and TN, can therefore be obtained at once in over one second. The leap second offset ΔtLS, the leap second update week WNLSF, the leap second update date DN, and the updated leap second offset ΔtLSF, on the other hand, are transmitted five to six seconds after TLM, and obtaining these pieces of reference information at once takes about six seconds. This embodiment therefore varies conditions for starting the reception operation depending on whether the information to be obtained is the time of week TOW and the week number WN, or the leap second offset ΔtLS, the leap second update week WNLSF, the leap second update date DN, and the updated leap second offset ΔtLSF.

Figure 17:
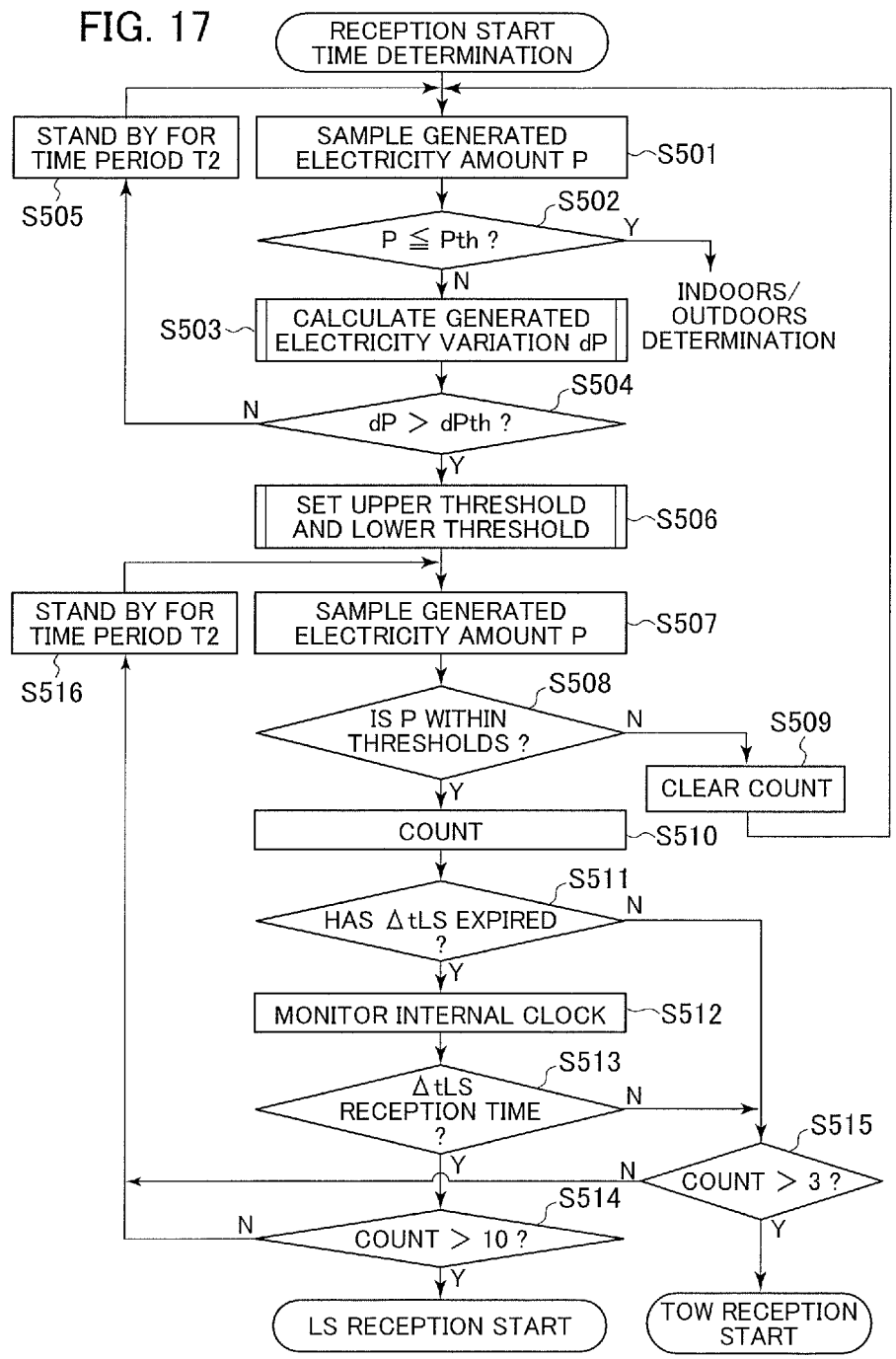
FIG. 17 A flow chart illustrating reception start time determining processing according to a fifth embodiment.

FIG. 17 is a flowchart illustrating yet another modification example of the reception start time determining processing of FIG. 10. In this processing, the controller 47 first samples the generated electricity amount P (S501). Whether or not the generated electricity amount P is equal to or less than the threshold Pth is determined next (S502). In the case where the generated electricity amount P is equal to or less than the threshold Pth, the controller 47 determines that the watch has been moved indoors, and returns to the indoors/outdoors determining processing of FIG. 9. In the case where the generated electricity amount P exceeds the threshold Pth, on the other hand, the controller 47 calculates the generated electricity variation dP (S503). Whether or not the calculated generated electricity variation dP exceeds the threshold dPth is determined next (S504). The threshold dPth may be a fixed value or the generated electricity amount P obtained in S501, or may be calculated from the moving average of the obtained generated electricity amount P as described above. In the case where the threshold dPth is not exceeded, the controller 47 waits until the time period T2 elapses from the last sampling time (S505), and then samples the generated electricity amount P again (S501).

In the case where the generated electricity variation dP exceeds the threshold dPth, on the other hand, the controller 47 determines that the watch face 2 has been directed upward, and subsequently checks the stability of the amount of light received. Specifically, an upper limit value and lower limit value of the generated electricity amount Pare set first (S506). The upper limit value and lower limit value may be calculated in the same manner described in the first embodiment. The controller 47 next samples the generated electricity amount P again (S507) and determines whether or not this generated electricity amount P falls between the upper limit value and lower limit value set in S506 (S508). In the case where the sampled amount falls between the limited values, the controller 47 increments a counter n, which is a variable having an initial value of 0, by 1 (S510).

At this point, the controller 47 determines whether or not the leap second offset ΔtLS, the leap second update week WNLSF, the leap second update date DN, and the updated leap second offset ΔtLSF that have not expired are stored in the volatile memory of the controller 47 (S511). In the case where those are stored, the controller 47 proceeds to S515. In the case where those are not stored, on the other hand, the controller 47 refers to the internal clock circuit (S512) to determine whether or not the current date/time precedes the transmission of page 18 of the sub-frame 4 and is within a given period of time (S513). When the answer is yes in S513, whether or not the counter n exceeds 10 is determined (S514). In the case where the counter n exceeds 10, the controller 47 switches the switch 56 on to allow the high-frequency circuit 46 and the decoder circuit 53 to operate, and obtains the leap second offset ΔtLS, the leap second update week WNLSF, the leap second update date DN, and the updated leap second offset ΔtLSF. In the case where the counter n does not exceed 10, the controller 47 waits until the time period T2 elapses from the last sampling time of the generated electricity amount P (S516), and returns to S507 to execute the subsequent processing steps. When the answer is no in S513, on the other hand, whether or not the counter n exceeds 3 is determined next (S515). In the case where the counter n exceeds 3, the controller 47 switches the switch 56 on to allow the high-frequency circuit 46 and the decoder circuit 53 to operate, and obtains the time of week TOW and the week number WN. In the case where the counter n does not exceed 3, the controller 47 waits until the time period T2 elapses from the last sampling time of the generated electricity amount P (S516), and returns to S507 to execute the subsequent processing steps. When it is determined in S508 that the generated electricity amount P does not fall between the upper limit value and lower limit value set in S506, the controller 47 initializes the counter n to 0 (S509) and then returns to S501 to execute the subsequent processing steps. Although whether or not the counter n exceeds 10 is determined in S514 and whether or not the counter n exceeds 3 is determined in S515, the values "10" and "3" are given as an example and it should be understood that values other than 10 and 3 can be set in the respective steps.

According to the control described above, in the case where it is the time of week TOW and the week number WN that are obtained, the reception operation is also executed when the light reception stability is relatively low. In the case where it is the leap second offset ΔtLS, the leap second update week WNLSF, the leap second update date DN, and the updated leap second offset ΔtLSF that are obtained, on the other hand, the reception operation is executed only when the light reception stability is relatively high. This is because receiving the latter is more difficult and requires a better reception environment. Thus, according to this embodiment, wasteful electric power consumption is prevented by executing the reception operation in a more stable reception environment for the leap second offset ΔtLS and other pieces of reference information that are more difficult to obtain.

Sixth Embodiment

Figure 18:
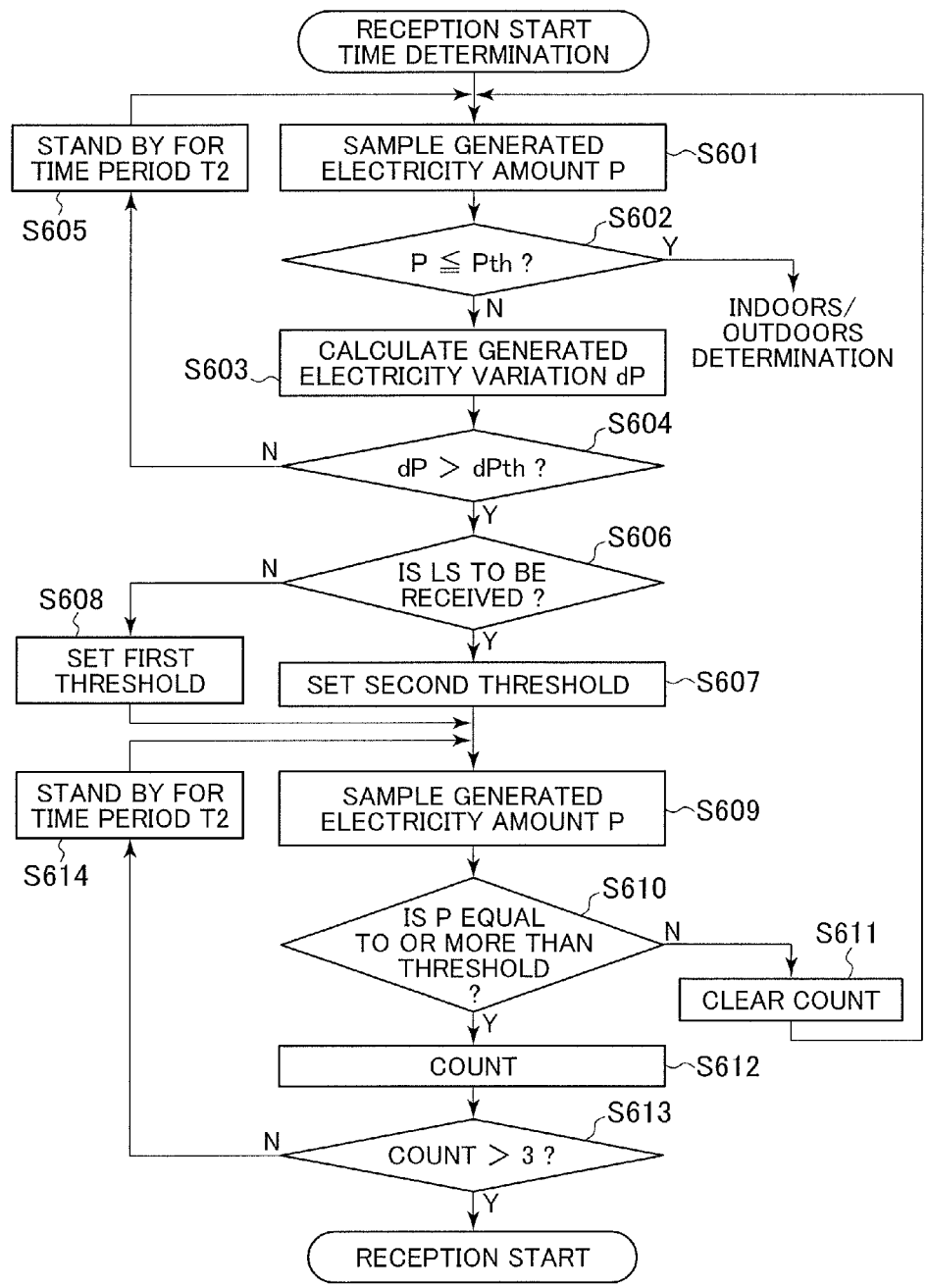
FIG. 18 A flow chart illustrating reception start time determining processing according to a sixth embodiment.

FIG. 18 is a flow chart illustrating further another modification example of the reception start timing determining processing of FIG. 10. In this processing, the controller 47 first samples the generated electricity amount P (S601). Whether or not the generated electricity amount P is equal to or less than the threshold Pth is determined next (S602). In the case where the generated electricity amount P is equal to or less than the threshold Pth, the controller 47 determines that the watch has been moved to the indoors, and returns to the indoors/outdoors determining processing of FIG. 9. In the case where the generated electricity amount P exceeds the threshold Pth, on the other hand, the controller 47 calculates the generated electricity variation dP (S603). Whether or not the calculated generated electricity variation dP exceeds the threshold dPth is determined next (S604). The threshold dPth may be a fixed value or the generated electricity amount P obtained in S601, or may be calculated from the moving average of the obtained generated electricity amount P as described above. In the case where the threshold dPth is not exceeded, the controller 47 waits until the time period T2 elapses from the last sampling time (S605), and then samples the generated electricity amount P again (S601).

In the case where the generated electricity variation dP exceeds the threshold dPth, on the other hand, the controller 47 determines that the watch face 2 has been directed upward, and subsequently checks the stability of the amount of light received. At this point, the controller 47 first determines whether it is the time of week TOW and the week number WN, or the leap second offset ΔtLS, the leap second update week WNLSF, the leap second update date DN, and the updated leap second offset ΔtLSF, that currently need to be obtained anew (S606). For example, in the case where the time of week TOW and the week number WN that have expired are stored, the controller 47 determines that these need to be obtained anew. In the case where the time of week TOW and the week number WN that have not expired are stored and one of the leap second offset ΔtLS, the leap second update week WNLSF, the leap second update date DN, and the updated leap second offset ΔtLSF is not stored or has expired, the controller 47 determines that the leap second offset ΔtLS and the same type of reference information need to be obtained anew. The pieces of data are respectively determined as expired in the same manner described in the first embodiment. In the case where it is determined that the time of week TOW and the same type of reference information need to be obtained anew, a first value Pth1 is set as the threshold of the generated electricity amount P (S608). In the case where the leap second offset ΔtLS and the same type of reference information need to be obtained anew, a second value Pth2 is set as the threshold of the generated electricity amount P (S607). The first and second values satisfy Pth2>Pth1.

After that, the controller 47 samples the generated electricity amount P again (S609) and determines whether or not this generated electricity amount P is equal to or more than the threshold set in S607 or S608 (S610). In the case where the sampled amount is equal to or more than the threshold, the controller 47 increments a counter n, which is a variable having an initial value of 0, by 1 (S612) and determines whether or not the counter n exceeds 3 (S613). In the case where the counter n exceeds 3, the controller 47 determines that the amount of light received is stable, switches the switch 56 on, and allows the high-frequency circuit 46 and the decoder circuit 53 to start obtaining the reference information which has been determined in S606 to need to be obtained anew.

In the case where the counter n does not exceed 3, on the other hand, the controller 47 waits until the time period T2 elapses from the last sampling of the generated electricity amount P in S609 (S614), and then returns to S609 to execute the subsequent processing steps. When it is determined in S610 that the generated electricity amount P is less than the threshold obtained in S607, the controller 47 initializes the counter n to 0 (S611) and then returns to S601 to execute the subsequent processing steps. Although whether or not the counter n exceeds 3 is determined in S613, the value "3" is given as an example and it should be understood that values other than 3 can be set.

In the manner described above, the leap second offset ΔtLS and other pieces of reference information that are more difficult to obtain can be received in an environment better than that of the time of week TOW and the week number WN, and wasteful power consumption is thus prevented.

Seventh Embodiment

In the first to sixth embodiments, whether the watch face 2 is directed upward is determined from the generated electricity variation dP. Alternatively, a satellite signal reception start time may be determined based on the posture of the satellite radio-controlled watch 100 that is detected by an acceleration sensor.

Figure 19:
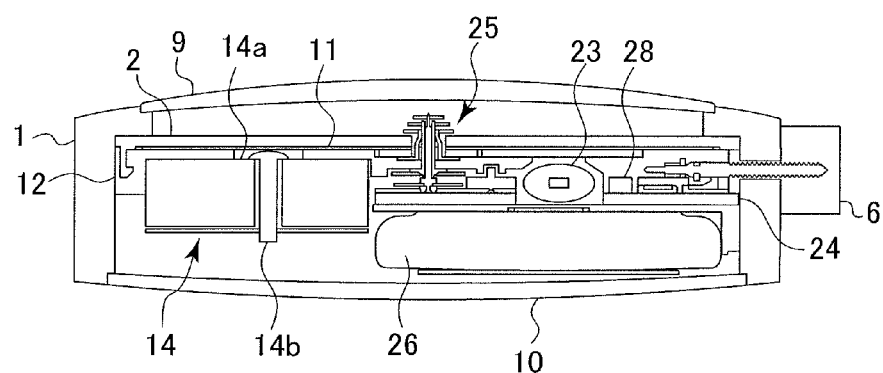
FIG. 19 A sectional view of a satellite ratio-controlled watch according to a seventh embodiment of the present invention.
Figure 20:
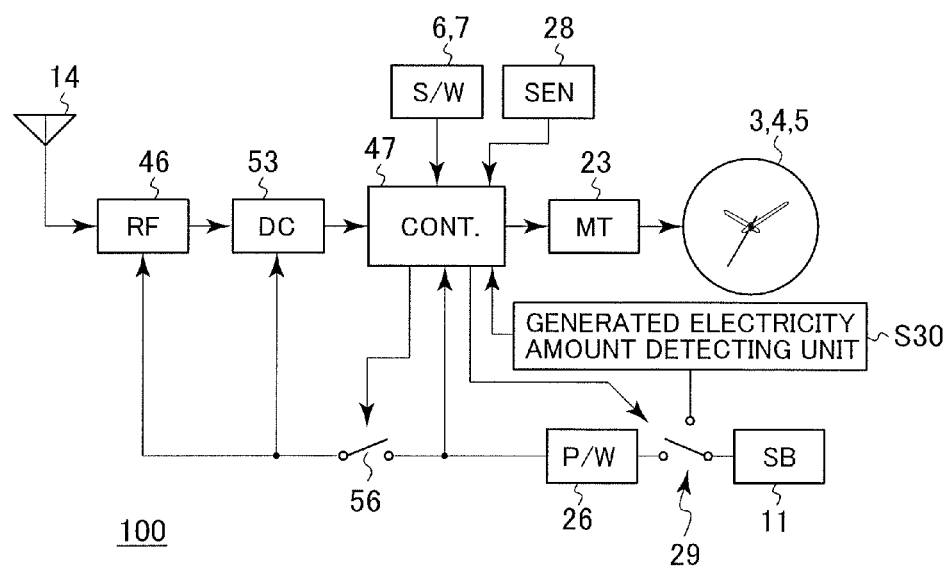
FIG. 20 A circuit configuration diagram of the satellite radio-controlled watch according to the seventh embodiment of the present invention.

As illustrated in FIG. 19 and FIG. 20, the seventh embodiment differs from the first to sixth embodiments in that an acceleration sensor 28 is mounted on the circuit board 24 and that the output of the acceleration sensor 28 is input to the controller 47. The acceleration sensor 28 is, for example, a two-axis acceleration sensor and outputs the acceleration in the respective detection axis directions as a voltage or as a digital value. In the case where the acceleration is output in voltage, the voltage is converted into a digital value by an AD converter built inside the controller 47. The acceleration sensor 28 is set up on the circuit board 24 so that the two detection axes of the acceleration sensor 28 are parallel to the reception surface 14a of the patch antenna 14. Accordingly, when the patch antenna 14 comes to a stop pointing upward in a vertical direction, the acceleration sensor 28 outputs 0 as the acceleration in each detection axis direction. The controller 47 calculates, as a tilt amount G, the mean square, root mean square, square sum, square root of sum of squares, or the like of the two detection axis directions, and determines satellite signal reception start time based on this tilt amount G.

Figure 21:
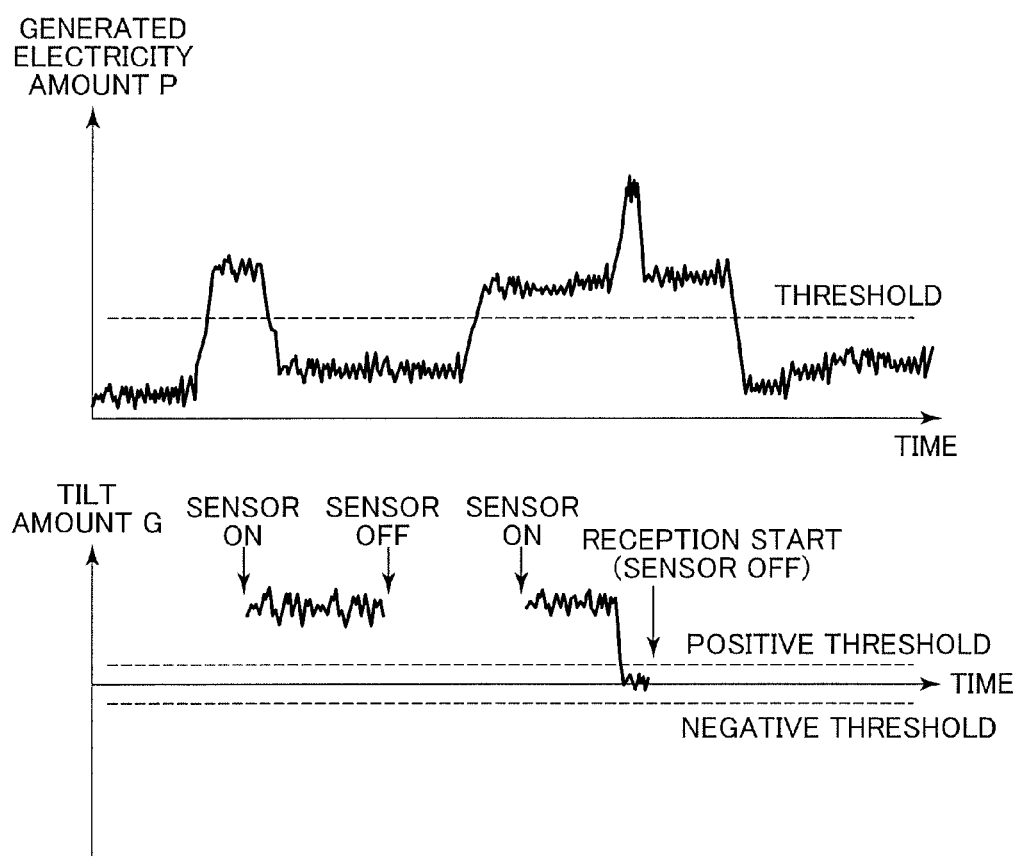
FIG. 21 A diagram illustrating an example of changes in generated electricity amount and in tilt amount.

FIG. 21 is a diagram illustrating an example of the transition of the generated electricity amount P and of the tilt amount G. In the seventh embodiment, when the worn satellite radio-controlled watch 100 is moved to the outdoors, causing the generated electricity amount P to exceed the threshold Pth, the interval for obtaining the generated electricity amount P is shortened and the acceleration sensor 28 is activated. In the opposite case where the worn satellite radio-controlled watch 100 is moved indoors, causing the generated electricity amount P to become equal to or less than the threshold Pth, the interval for obtaining the generated electricity amount P is widened and the acceleration sensor 28 is suspended. When the watch face 2 is directed upward in a vertical direction outdoors, the tilt amount G takes a value around 0. Therefore, in the case where a given period of time elapses while the tilt amount G stays around 0, satellite signal reception is started and the operation of the acceleration sensor 28 is stopped. By suspending the acceleration sensor 28 at the time the reception is started, the acceleration sensor 28 is prevented from being driven unnecessarily and electric power consumption is reduced even more.

Figure 22:
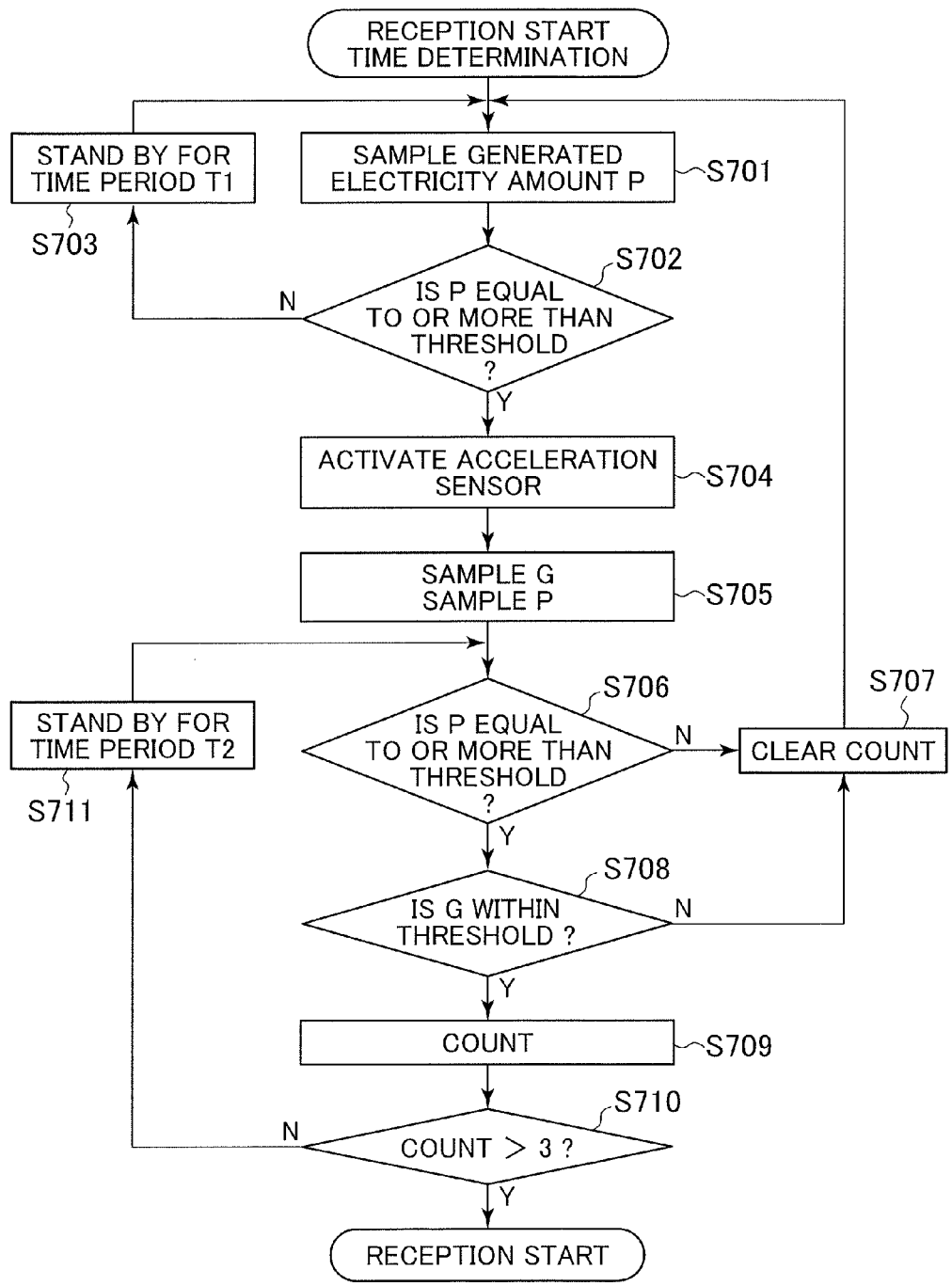
FIG. 22 A flow chart illustrating reception start time determining processing according to the seventh embodiment.

FIG. 22 is a flow chart illustrating indoors/outdoors determining processing and reception start time determining processing of the satellite radio-controlled watch 100 according to the seventh embodiment. In this processing, the controller 47 first samples the generated electricity amount P (S701). Whether or not the generated electricity amount P exceeds the threshold Pth is determined (S702). In the case where the generated electricity amount P does not exceed the threshold Pth, the controller 47 waits until the time period T1 elapses from the last sampling time (S703), and samples the generated electricity amount P again (S701). In the case where the generated electricity amount P exceeds the threshold Pth, on the other hand, the controller 47 determines that the watch has been moved to the outdoors and activates the acceleration sensor 28 (S704).

Thereafter, the controller 47 calculates the tilt amount G based on the output of the acceleration sensor 28, and samples the generated electricity amount P again (S705). Whether or not the generated electricity amount P is equal to or more than the threshold Pth is determined next (S706). In the case where the generated electricity amount P is less than the threshold Pth, the controller 47 initializes the counter n to 0 (S707) and then returns to S701. In the case where the generated electricity amount P is equal to or more than the threshold Pth, on the other hand, the controller 47 determines whether or not the tilt amount G is equal to or more than 0 and less than Δ (S708). As Δ, a minute value is set so that the patch antenna 14 can receive a satellite signal well. In the case where the tilt amount G is equal to or more than Δ, the controller 47 initializes the counter n to 0 (S707) and then returns to S701.

In the case where the tilt amount G is equal to or more than 0 and less than Δ, on the other hand, the controller 47 increments the counter n by 1 (S709), and determines whether or not the counter n exceeds 3 (S710). In the case where the counter n exceeds 3, the controller 47 determines that the amount of light received is stable, switches the switch 56 on, and allows the high-frequency circuit 46 and the decoder circuit 53 to start obtaining the reference information. The operation of the acceleration sensor 28 is stopped at this point. In the case where the counter n does not exceed 3, on the other hand, the controller 47 waits until the time period T2 elapses from the last time the generated electricity amount P is sampled in S705 (S711), and returns to S705 to execute the subsequent processing steps. Although whether or not the counter n exceeds 3 is determined in S710, the value "3" is given as an example and it should be understood that values other than 3 can be set.

According to the embodiment described above, whether or not the watch face 2 is directed upward can be determined with the use of the output of the acceleration sensor 28, and the satellite signal reception operation is executed only when it is determined that the watch face 2 is directed upward. Wasteful electric power consumption is thus prevented.

Eighth Embodiment

Figure 23:
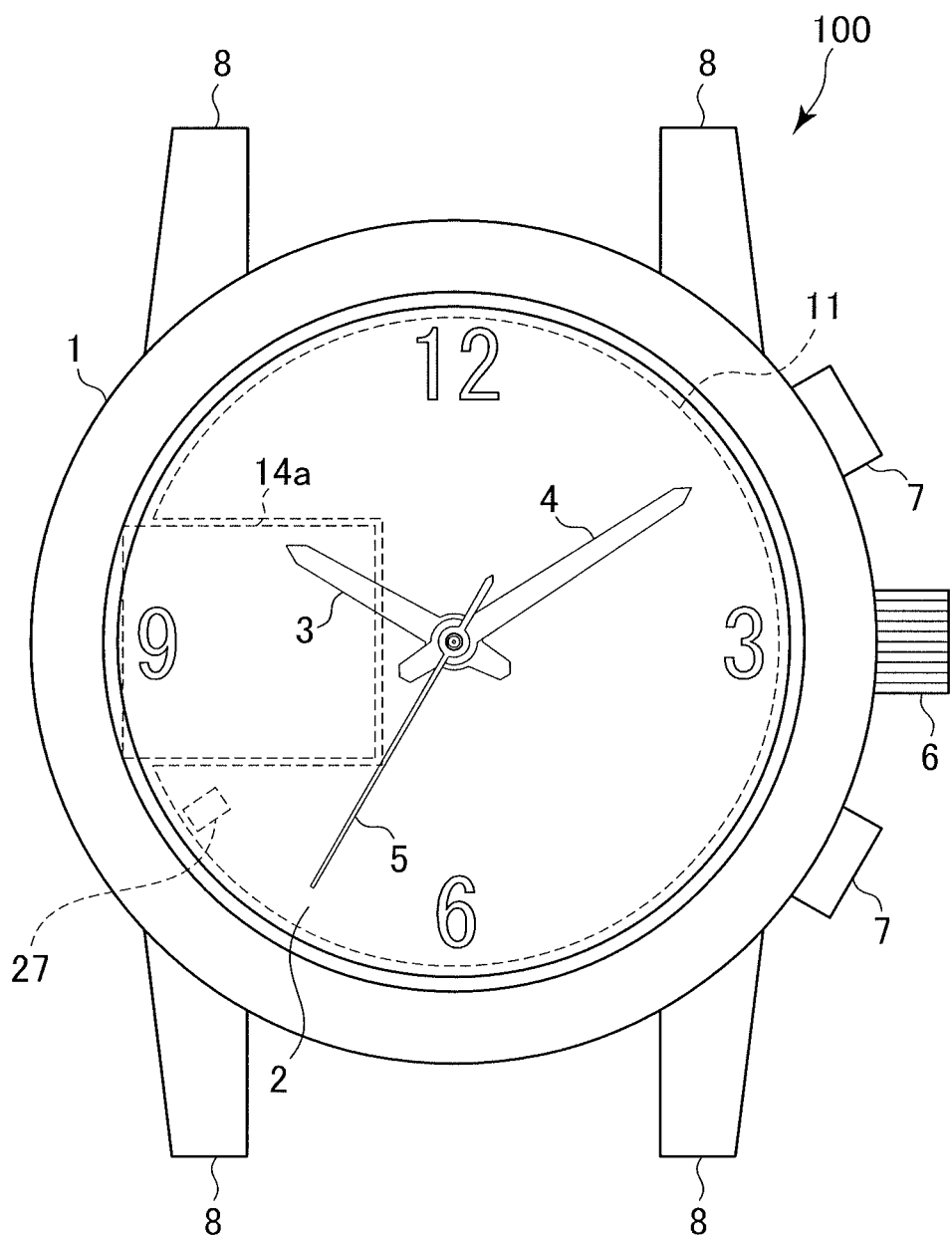
FIG. 23 A plan view of a satellite radio-controlled watch according to an eighth embodiment.

While a two-axis acceleration sensor is used to detect the posture of the satellite radio-controlled watch 100 in the seventh embodiment, a single-axis acceleration sensor may also be used. To describe in more detail, when the satellite radio-controlled watch 100 is worn on a left arm, the satellite radio-controlled watch 100 executes mainly rotation about an axis that connects the twelve o'clock point and the six o'clock point which is caused by the motion of lifting the arm, or rotation about an axis that connects the three o'clock point and the nine o'clock point which is caused by the motion of twisting the arm. Therefore, if a single-axis acceleration sensor 27 is set up on the circuit board 24 so that the detection axis of the single-axis acceleration sensor 27 coincides with a line that connects a point between twelve o'clock and three o'clock and a point between nine o'clock and six o'clock as illustrated in FIG. 23, the single-axis acceleration sensor 27 outputs 0 when the watch face 2 is directed upward in a vertical direction, and otherwise outputs values other than 0. By executing the processing of FIG. 22 with the output of the single-axis acceleration sensor 27 as the tilt amount G, reception start time can be determined appropriately with the use of the single-axis acceleration sensor 27. The single-axis acceleration sensor 27 may also be set up on the circuit board 24 so that the detection axis of the single-axis acceleration sensor 27 coincides with a line that connects a point between nine o'clock and twelve o'clock and a point between three o'clock and six o'clock.

Ninth Embodiment

A satellite radio-controlled watch 100 in a ninth embodiment checks expiration dates of the various types of reference information which are extracted from a satellite signal and saved in the manner illustrated in FIG. 4, and obtains anew a piece of reference information that has expired. For example, the time of week TOW is determined as expired when forty-eight hours have elapsed from the last reception date/time. In the case where the accuracy of an internal clock is fifteen seconds per month, approximately one second of speeding up or slowing down may occur in forty-eight hours (two days). By determining the time of week TOW as expired after forty-eight hours and obtaining TOW anew, the speeding up or slowing down of the internal clock can continually be kept within about one second. The week number WN is determined as expired when one week, for example, has elapsed since the last reception date/time. The leap second offset ΔtLS, the leap second update week WNLSF, the leap second update date DN, and the updated leap second offset ΔtLSF are determined as expired when six months have elapsed since the last reception date/time, or when the month of a date identified by the already stored leap second update week WNLSF and leap second update date DN turns to the next month. In the case where one of the pieces of information is found to have expired, the reception circuit 31 is activated depending on the reception environment, and the information is obtained.

Adjusting the internal time as described above requires the time of week TOW, the week number WN, and the leap second offset ΔtLS. In this embodiment, the reception circuit 31 is activated in time with the transmission time of page 18 of the sub-frame 4, which arrives once every 12.5 minutes as described above, according to the internal time output by the internal clock circuit. The time of week TOW is obtained from HOW contained in page 18 of the sub-frame 4. The leap second offset ΔtLS, the leap second update week WNLSF, the leap second update date DN, and the updated leap second offset ΔtLSF that are contained in the same page 18 of the sub-frame 4 are also obtained if necessary. The week number WN is further obtained, if necessary, from page 19 of the following sub-frame 1. Receiving the time of week TOW is relatively easy as described above. The accuracy of the week number WN can be maintained as long as the time of week TOW and the leap second offset ΔtLS are updated. Receiving the leap second offset ΔtLS, on the other hand, is difficult as described above. This embodiment therefore preferentially enhances the chance of successful reception of the leap second offset ΔtLS by activating the reception circuit 31 in time with the transmission time of page 18 of the sub-frame 4.

As illustrated in FIG. 24, this embodiment sets different generated electricity amount conditions for activating the reception circuit 31, namely, the lower limit of the generated electricity amount of the solar battery 11, and different activation count conditions, namely, the number of times the reception circuit 31 is activated within a given period of time (e.g., twenty-four hours), for the case where the time of week TOW is obtained, the case where the leap second offset ΔtLS, the leap second update week WNLSF, the leap second update date DN, and the updated leap second offset ΔtLSF (hereinafter, referred to as leap second information) are obtained, and the case where the week number WN is obtained. The activation conditions illustrated in FIG. 24 are stored in the controller 47 so that a generated electricity amount condition (the lower limit of the generated electricity amount) and an activation count condition (the upper limit of the activation count per day) are written in association with the type of reference information to be obtained (whether it is the time of week TOW, the leap second information, or the week number WN that is to be obtained). According to the activation conditions of FIG. 24, when it is the time of week TOW that is to be obtained, the reception circuit 31 is activated even when the generated electricity amount of the solar battery 11 is "small", whereas when it is the leap second information or the week number WN that is to be obtained, the reception circuit 31 is not activated unless the generated electricity amount of the solar battery 11 is "large". This is to account for the differences in reception difficulty among the time of week TOW, the leap second information, and the week number WN. To elaborate, the time of week TOW is contained in the first 17 bits of HOW and, even with TLM, takes up only 47 bits. The time of week TOW can therefore be received in under one second (in the case of 50 bps). Even the entire HOW plus TLM uses only 60 bits and can be received instantly in 1.2 seconds. The series of leap second information, on the other hand, is contained in the latter half of page 18 of the sub-frame 4, and receiving the leap second offset ΔtLS alone takes about five seconds, and obtaining the leap second information in its entirety requires about six seconds. The week number WN is contained at the header of the sub-frame 1, and can be obtained by receiving the entire sub-frame 4, the entire sub-frame 5, and the first 70 bits of the sub-frame 1. Obtaining the week number WN therefore requires receiving 670 bits of data in total (one sub-frame equals 300 bits), and takes over thirteen seconds. The time of week TOW, the leap second information, and the week number WN thus differ greatly from one another in reception difficulty, and accordingly in reception environment necessary for successful reception. In this embodiment, a generated electricity amount condition is therefore stored in advance for each type of reference information, and whether to actually activate the reception circuit 31 is determined by determining whether or not a generated electricity amount condition that is associated with the reference information to be obtained is fulfilled. The generated electricity amount in this embodiment is sorted into "large", "intermediate", "small", and "disabled" in the order of magnitude to be used in control.

Even when the generated electricity amount is sufficient, activating the reception circuit 31 for every 12.5 minutes and failing to obtain the respective types of reference information each time diminishes the remaining battery power of the battery 26 rapidly. The activation count conditions are therefore set as well as illustrated in FIG. 24 in order to limit the number of times per day the reception circuit 31 is activated. The reception circuit 31 needs to operate for a longer period of time and accordingly consumes more electric power to receive the leap second information and the week number WN than when the time of week TOW is received. Different activation count conditions are therefore set for the time of week TOW, the leap second information, and the week number WN. In addition, if the consumed electric power is the same, the reference information is more likely to be obtained properly when the reception circuit 31 is activated in the case where the generated electricity amount is "large" than in the case where the generated electricity amount is "small". In short, the number of times the reception circuit 31 is activated is desirably varied depending on the reception environment. A different activation count condition is therefore set for each range of generated electricity amount. Specifically, according to the activation count conditions of FIG. 24, upper limits are respectively set for the number of times per day the reception circuit 31 is activated in order to obtain the time of week TOW when the generated electricity amount is "large", the number of times per day the reception circuit 31 is activated to obtain the time of week TOW when the generated electricity amount is "intermediate", and the number of times per day the reception circuit 31 is activated to obtain the time of week TOW when the generated electricity amount is "small". Similarly, upper limits are respectively set for the number of times per day the reception circuit 31 is activated to obtain the leap second information or the week number WN when the generated electricity amount is "large".

Activating the reception circuit 31 repeatedly and successively despite no changes in the reception environment is likely to result in successive failures to obtain the reference information. This embodiment therefore saves electric power by activating the reception circuit 31 when there is a change in the reception environment, in other words, when the amount of electricity generated by the solar battery 11 increases. FIG. 25 schematically illustrates the transition of the amount of electricity generated by the solar battery 11, time for obtaining the generated electricity amount, and time for activating the reception circuit 31. Time for obtaining the generated electricity amount is indicated by a circle and time for activating the reception circuit 31 is indicated by a double circle. In this embodiment, the amount of electricity generated by the solar battery 11 is sampled every 12.5 minutes as illustrated in FIG. 25, but the reception circuit 31 is not always activated even when the generated electricity amount satisfies the activation condition. The reception circuit 31 is activated in this embodiment only when the generated electricity amount has risen and is equal to or more than a lower limit that is associated with reference information to be obtained. Activating the reception circuit 31 repeatedly in vain, which leads to a rapid drop in the remaining battery power of the battery 26, is thus prevented.

Figure 26:
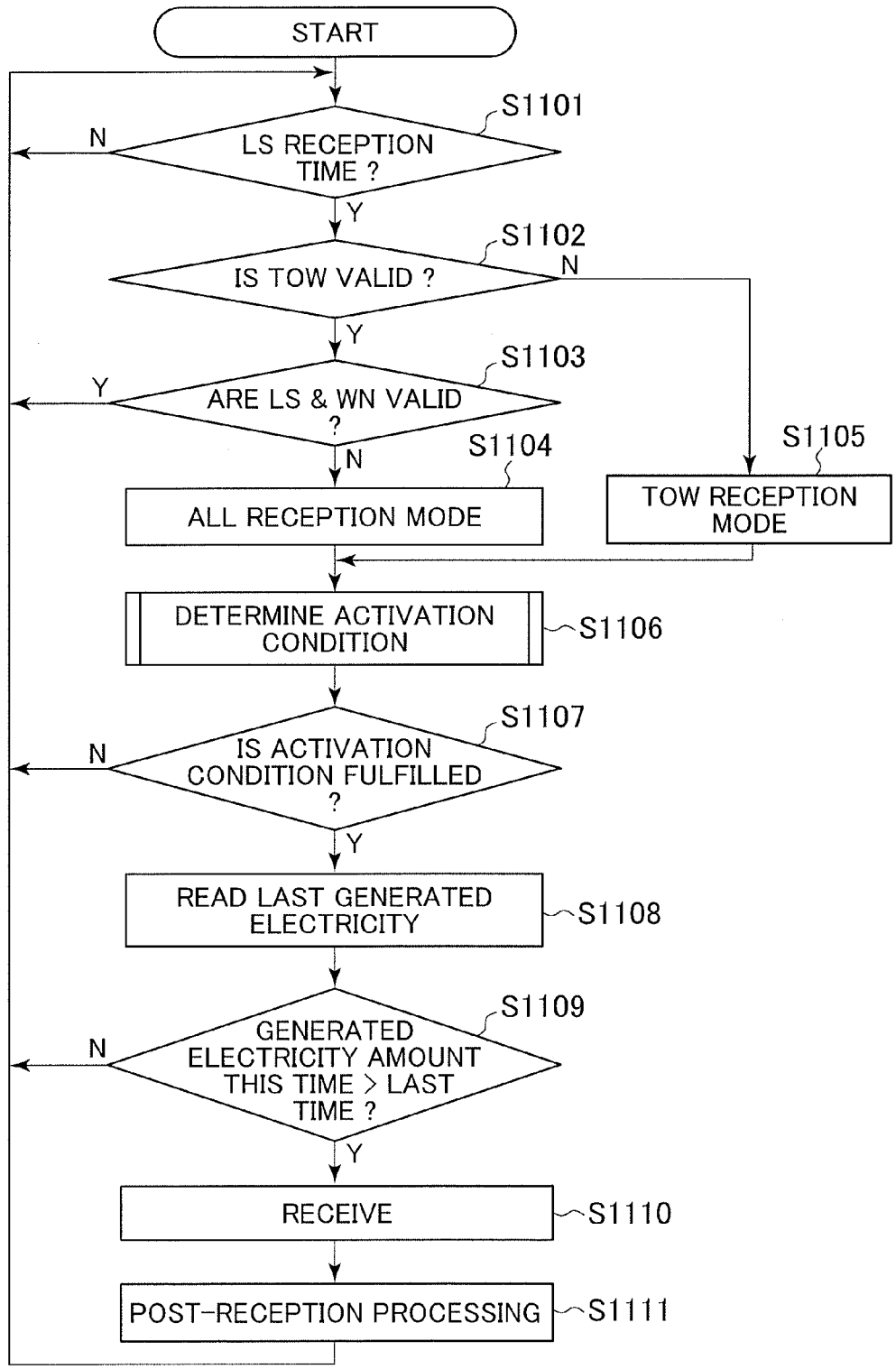
FIG. 26 A control flow chart of a receiving operation.
Figures 27, 28:
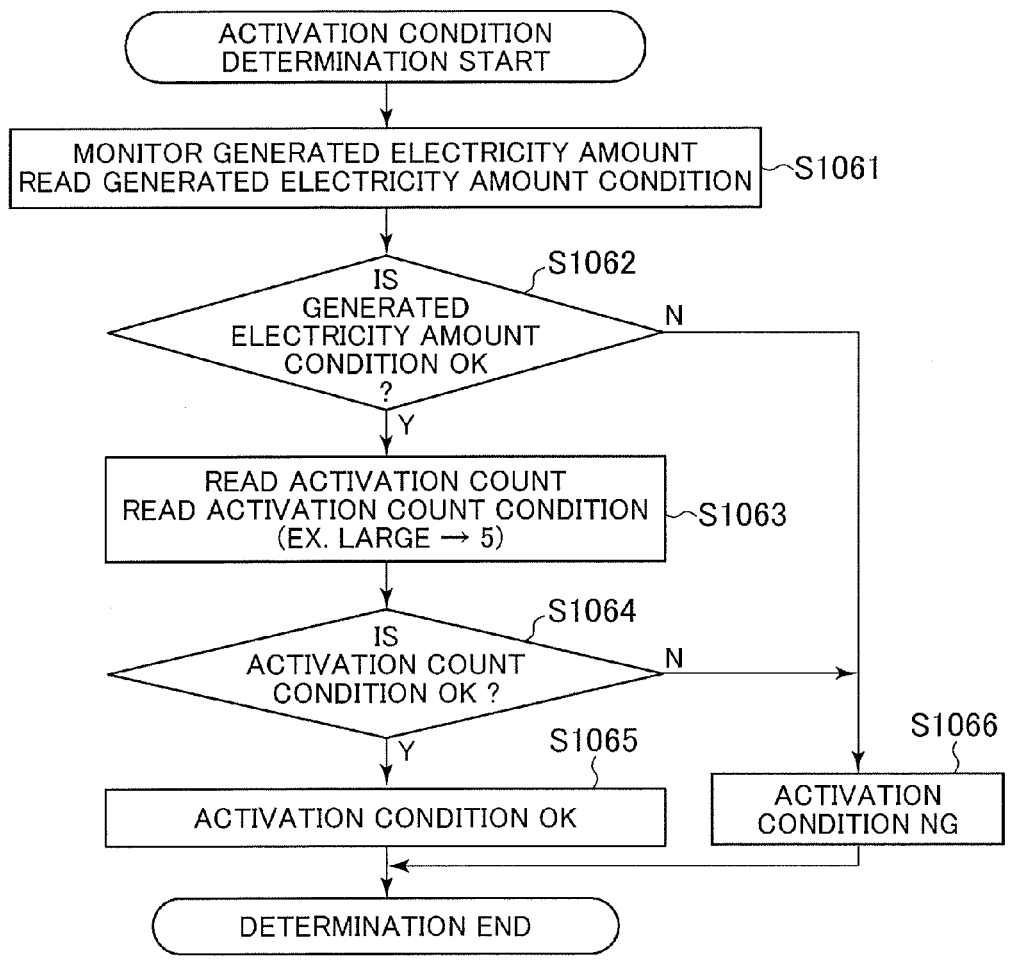
FIG. 27 A detailed flow chart of the activation condition determining processing.
FIG. 28 A diagram illustrating the reception circuit activation counts of respective pieces of reference information in respective ranges of generated electricity amount.

FIG. 26 is a flowchart illustrating processing of activating the reception circuit 31 which is executed by the controller 47. FIG. 27 is a detailed flow chart of activation condition determining processing. As illustrated in FIG. 26, the controller 47 first waits for the reception time of page 18 of the sub-frame 4 according to the internal clock (S1101). When the reception time of page 18 of the sub-frame 4 (a time preceding a head of page 18 of the sub-frame 4 by a given period of time (e.g., two to three seconds)) arrives, the controller 47 determines whether or not the time of week TOW is valid (S1102). In the case where the time of week TOW is found to have expired, a TOW reception mode is set (S1105). In the case where the time of week TOW has not expired, the controller 47 determines whether or not the leap second information and the week number WN are both valid (S1103). In the case where at least one of the leap second information and the week number WN is found to have expired, an all reception mode is set (S1104). In the case where the leap second information and the week number WN have both not expired, on the other hand, the controller 47 returns to the processing of S1101.

The controller 47 next determines whether or not the activation condition is fulfilled (S1106). Specifically, as illustrated in FIG. 27, the controller 47 switches the switch 29 to obtain the amount of electricity generated by the solar battery 11 (one of "large", "intermediate", "small", and "disabled"), and also obtain a generated electricity amount condition that is associated with the expired reference information (S1061). In the case where a plurality of pieces of reference information have expired, the controller 47 obtains a generated electricity amount condition that is associated with each piece of reference information. The controller 47 next determines whether or not the generated electricity amount obtained in S1061 fulfills each generated electricity amount condition obtained (S1062). In the case where the generated electricity amount obtained in S1061 fulfills none of the generated electricity amount conditions obtained, it is determined that the activation condition is not fulfilled (S1066). The controller 47 returns to the processing of S1101 in this case (S1107).

In the case where the generated electricity amount obtained in S1061 fulfills any one of the generated electricity amount conditions, reference information that is associated with the generated electricity amount fulfilled is set as temporary reception target reference information. The controller 47 then reads an actual activation count and an activation count condition that are associated with the temporary reception target reference information (S1063). As illustrated in FIG. 28, the controller 47 stores, as the actual activation counts for each of the generated electricity amount values "large", "intermediate", and "small", the number of times the reception circuit 31 is activated in a day (from a given time to the same time the next day) in order to obtain the week of time TOW, the number of times the reception circuit 31 is activated in a day in order to obtain the leap second information, and the number of times the reception circuit 31 is activated in a day in order to obtain the week number WN. The actual activation count includes nine numbers in total which correspond to the number of types of reference information and the number of different values of the generated electricity amount, "large", "intermediate", and "small". These nine numbers are reset to 0 at a given time every day. In the processing of S1063, the controller 47 reads an actual activation count that is stored in association with the temporary reception target reference information and with the generated electricity amount obtained in S1061. When there are a plurality of pieces of temporary reception target reference information, an associated actual activation count is read for every piece of temporary reception target reference information. The controller 47 further reads an activation count condition that is associated with the temporary reception target reference information and the generated electricity amount obtained in S1061. The controller 47 then determines whether or not the read actual activation count fulfills the read associated activation count condition, in other words, whether the actual activation count is equal to or less than the upper limit count (S1064). In the case where a plurality of actual activation counts have been read and one of the actual activation counts fulfills its associated activation count condition, the answer to S1064 is determined as "Y" (yes). Temporary reception target reference information for which the actual activation count fulfills the activation count condition is set as established reception target reference information in this case. In the case where none of the actual activation counts fulfill their associated activation count conditions, on the other hand, the answer to S1064 is determined as "N" (no). The controller 47 in this case determines that the activation condition is not fulfilled (S1066), and returns to the processing of S1101 (S1107). For each activation count condition, whether or not the activation count condition is fulfilled may be determined by determining whether or not the sum of actual activation counts associated with generated electricity amounts equal to or more than a generated electricity amount that is associated with the activation count condition is equal to or less than the activation count condition (the upper limit count). This way, whether or not the reference information in question has been received a sufficient number of times can be determined by taking into consideration all of actual reception instances where the reference information in question has been received in a better environment. When the answer to S1064 is determined as "Y", on the other hand, the controller 47 determines that the activation condition is fulfilled (S1065) and proceeds to the processing of S1108 (S1107).

Returning to FIG. 26, the last generated electricity amount (one of "large", "intermediate", "small", and "disabled") which is stored in advance is read in the processing of S1108. The last generated electricity amount is stored in the controller 47 in S1111 each time the reception circuit 31 is activated. The controller 47 then determines whether or not the generated electricity amount obtained in S1061 is larger than the last generated electricity amount (S1109). In the case where the generated electricity amount obtained in S1061 is equal to or less than the last generated electricity amount, the controller 47 returns to S1101. In the case where the generated electricity amount obtained in S1061 is larger than the last generated electricity amount, on the other hand, the controller 47 next connects the switch 56 and activates the reception circuit 31 (S1110).

Once the reception circuit 31 is activated, the switch 56 is kept switched on only for a period of time that is determined by the reception mode, the number of pieces of established reception target reference information, and the type of the established reception target reference information. The switch 56 is then switched off and satellite data of the period of time is received. Specifically, in the case where the reception mode is the TOW reception mode and the established reception target reference information is the time of week TOW, data from the head of page 18 of the sub-frame 4 to the part where the time of week TOW is contained is received. In the case where the reception mode is the all reception mode and the established reception target reference information includes the week number WN, data from the head of page 18 of the sub-frame 4 to a part of page 19 of the sub-frame 1 where the week number WN is contained is received. In the case where the reception mode is the all reception mode and the established reception target reference information does not include the week number WN but includes the leap second information, data from the head of page 18 of the sub-frame 4 to the part where the leap second information is contained is received. Thereafter, various types of post-reception processing are executed (S1111). To describe in more detail, the generated electricity amount obtained in S1061 is stored in the controller 47 as the last generated electricity amount described above. The actual activation count illustrated in FIG. 28 is updated. Specifically, an actual activation count that is associated with the generated electricity amount obtained in S1061 and the established reception target reference information is increased by 1. In the case where one of the pieces of reference information has been successfully obtained, the last reception value and the last reception date/time are updated in the table of FIG. 4. The internal time is also adjusted in accordance with the updated reference information. In the case where other pieces of reference information than the established reception target reference information have been obtained successfully as well, these pieces of reference information may also be updated. The controller 47 then executes S1101 and the subsequent processing steps again.

According to the embodiment described above, the condition concerning the amount of electricity generated by the solar battery 11 is varied between the case where the time of week TOW is obtained and the case where the leap second information or the week number WN is obtained. In other words, different conditions for activating the reception circuit 31 are set by taking into account the reception difficulty, which varies from one type of reference information to another. Wasteful electric power consumption is thus prevented. An upper limit is also set for the number of times per day the reception circuit 31 is activated, and the reception circuit 31 is activated only when the amount of electricity generated by the solar battery 11 increases. This embodiment thus prevents repeatedly failed attempts to obtain reference information.

Figures 29, 30:
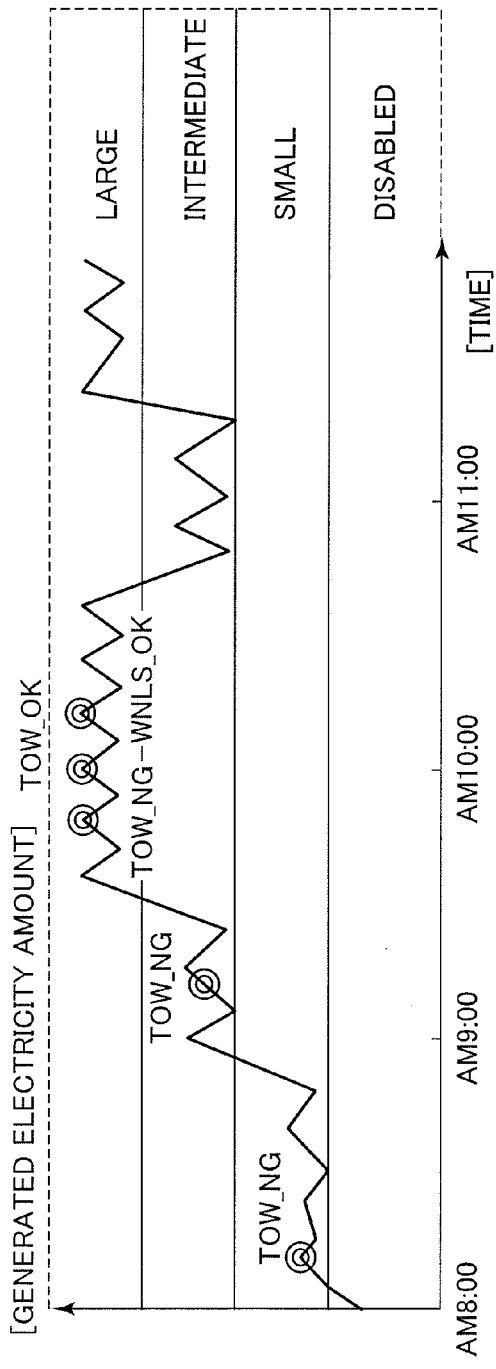
FIG. 29 A diagram illustrating reception circuit activation conditions after a change.
FIG. 30 A diagram illustrating Modification Example 1 of reference information reception timing.

In the case where a piece of reference information has expired and this piece of reference information cannot be obtained anew for a given period of time, the generated electricity amount condition and activation count condition of this piece of reference information may be relaxed as illustrated in FIG. 29. The generated electricity amount condition and the activation count condition which are stored in the controller 47 are updated in this case. For example, in the case where the leap second information cannot be obtained anew for a given number of days, the lower limit of the generated electricity amount may be changed to "intermediate". The upper limit of the activation count of the reception circuit 31 may also be raised.

Modification Example 9-1

While the interval for obtaining the generated electricity amount is fixed to 12.5 minutes in the description given above, the acquisition interval may be set to 12.5×n minutes, with n varied to suit the amount of electricity generated. FIG. 30 illustrates the transition of generated electricity amount and the interval for obtaining the generated electricity amount. As illustrated in FIG. 30, n may be set small so that the acquisition interval is shorter when the generated electricity amount is larger, or may conversely be set large so that the acquisition interval is longer when the generated electricity amount is smaller.

Figure 31:
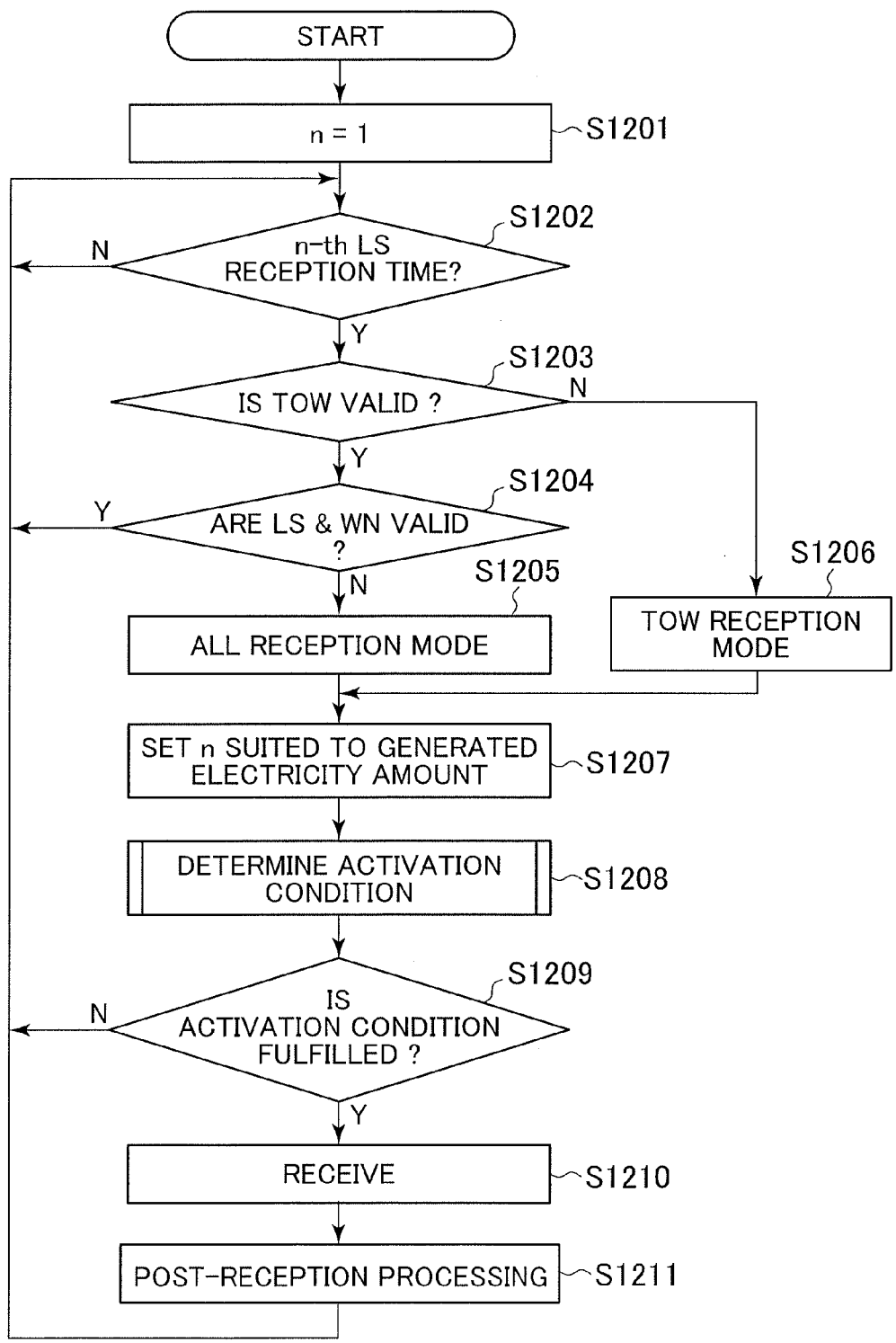
FIG. 31 A control flow chart of a receiving operation according to Modification Example 9-1.

FIG. 31 is a flow chart illustrating Modification Example 9-1 of the processing of activating the reception circuit 31 which is executed by the controller 47. As illustrated in FIG. 31, the controller 47 first initializes a variable n, which determines the interval of obtaining the generated electricity amount, to 1 (S1201). The controller 47 next determines whether or not the n-th time for receiving page 18 of the sub-frame 4 has arrived, with the last reception time as the starting point, according to the internal time (S1202). When the n-th time for receiving page 18 of the sub-frame 4 (a time preceding head time of page 18 of the sub-frame 4 by a given period of time (e.g., two to three seconds)) arrives, the controller 47 next determines whether or not the time of week TOW is valid (S1203). In the case where the time of week TOW is found to have expired, the TOW reception mode is set (S1206). In the case where the time of week TOW has not expired, on the other hand, the controller 47 determines whether or not the leap second information and the week number WN are both valid (S1204). The controller 47 returns to the processing of S1202 when both are valid. In the case where at least one of the leap second information and the week number WN is found to have expired, the all reception mode is set (S1205).

Thereafter, the controller 47 switches the switch 29 to obtain the amount of electricity generated by the solar battery 11, and sets the variable n to a value suited to the generated electricity amount obtained (S1207). For example, the variable n is set to 1 when the generated electricity amount is "large", to 3 when the generated electricity amount is "intermediate", and to 5 when the generated electricity amount is "small". These values are given as an example, and other appropriate values can be set. The controller 47 also determines whether or not conditions for activating the reception circuit 31 (a generated electricity amount condition and an activation count condition) are satisfied in the same manner described in S1106 (S1208). In the case where the activation conditions are satisfied (S1209), the controller 47 connects the switch 56 and activates the reception circuit 31 (S1210). In the case where the activation conditions are not satisfied (S1209), on the other hand, the controller 47 returns to S1202.

Once the reception circuit 31 is activated, the switch 56 is kept switched on only for a period of time that is determined by the reception mode, the number of pieces of established reception target reference information, and the type of the established reception target reference information. The switch 56 is then switched off and satellite data of the period of time is received. Thereafter, various types of post-reception processing are executed in the same manner as in the processing of S1109 (S1211), and the controller 47 then executes S1202 and the subsequent processing steps again.

In the manner described above, the interval for obtaining the generated electricity amount can be varied depending on the magnitude of the generated electricity amount. When the generated electricity amount is small, an environment suitable for reception is not likely to be realized soon. Obtaining the generated electricity amount involves disconnecting the solar battery 11 and the battery 26 with the use of the switch 29, and the charging is interrupted. The interval for obtaining the generated electricity amount is therefore set long when the amount of electricity generated is small, thus increasing occasions for charging the battery 26 and raising the charging efficiency.

Modification Example 9-2

Figure 32:
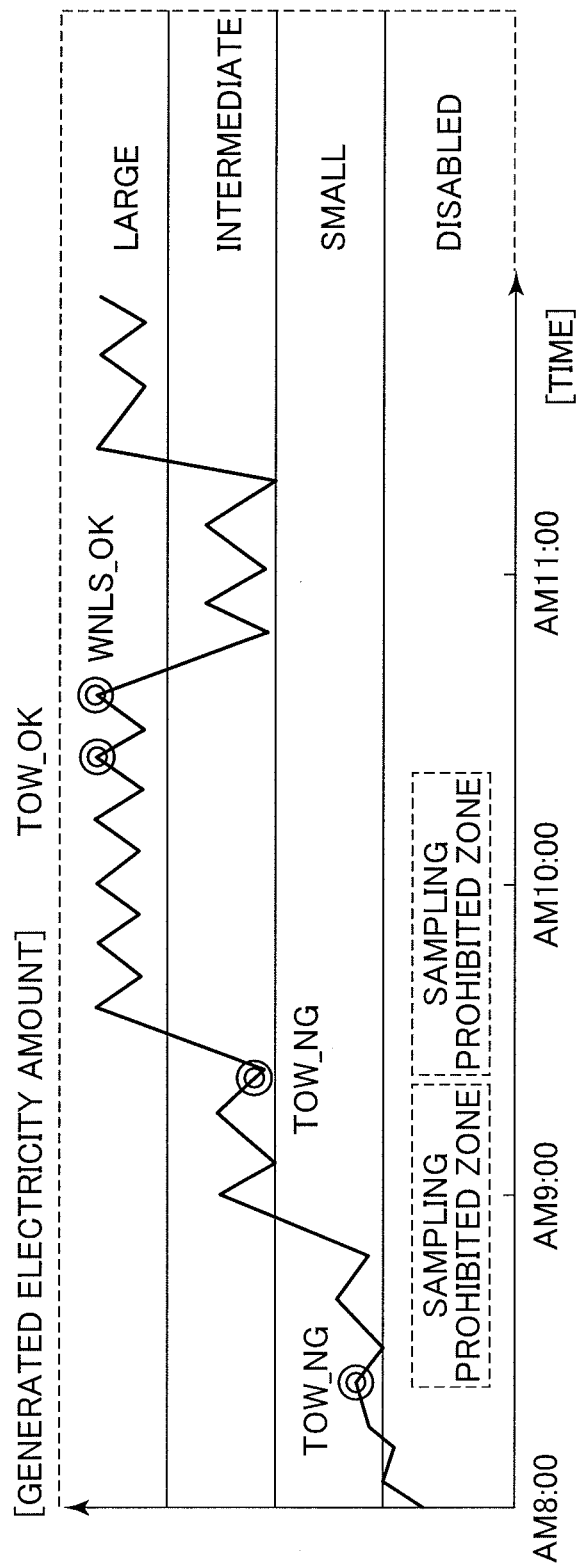
FIG. 32 A diagram illustrating Modification Example 2 of reference information reception timing.

In the case where the watch fails to obtain the reference information, obtaining the generated electricity amount may be prohibited for a given period of time. FIG. 32 illustrates the transition of generated electricity amount and time for obtaining the generated electricity amount. As illustrated in FIG. 32, in Modification Example 2, obtaining the generated electricity amount is prohibited for a given period of time when the watch fails to obtain the reference information.

Figure 33:
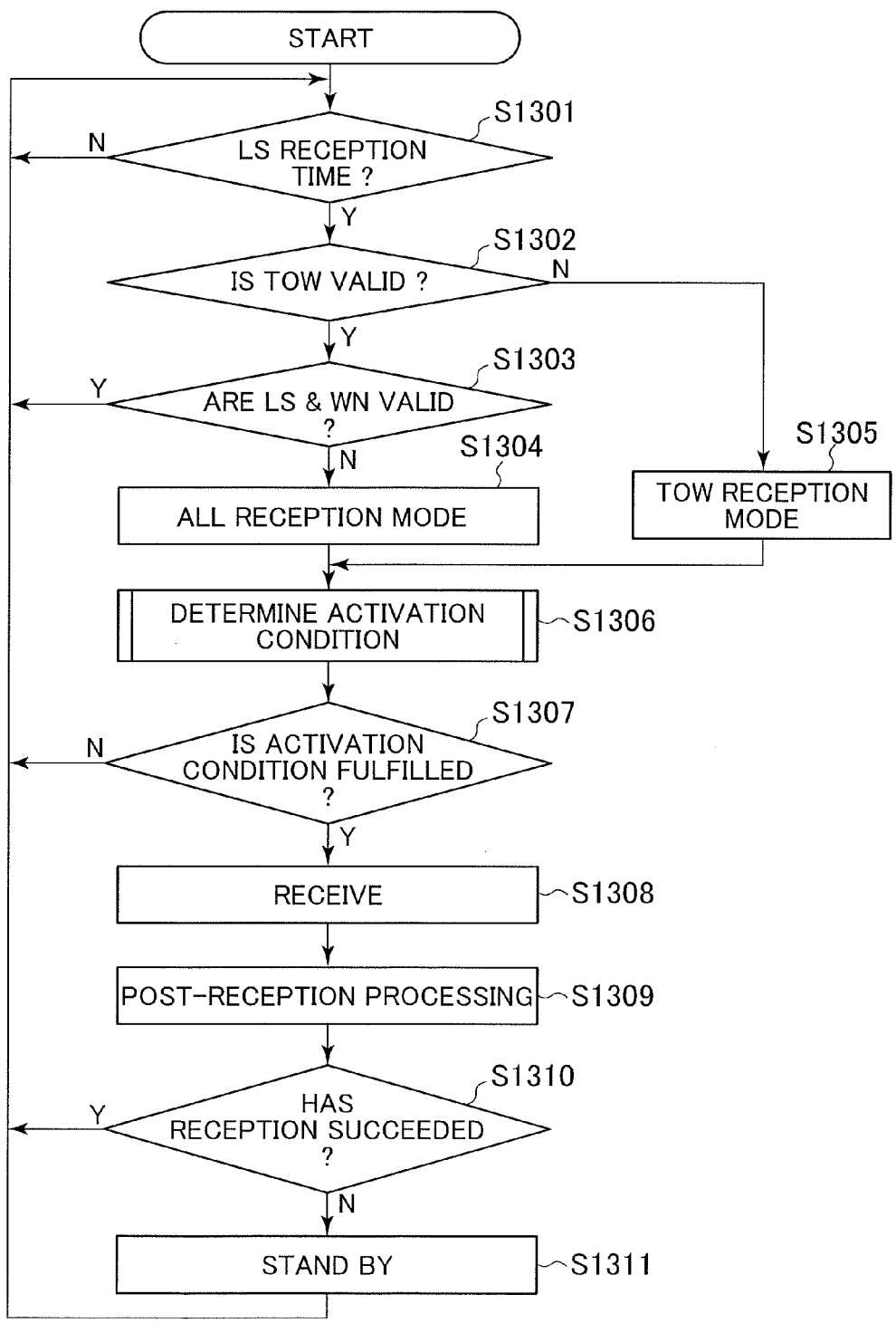
FIG. 33 A control flow chart of a receiving operation according to Modification Example 9-2.

FIG. 33 is a flowchart illustrating Modification Example 9-2 of the processing of activating the reception circuit 31 which is executed by the controller 47. As illustrated in FIG. 33, the controller 47 first waits for a time for receiving page 18 of the sub-frame 4 according to the internal time (S1301). When this time arrives, the controller 47 next determines whether the time of week TOW is valid (S1302). In the case where the time of week TOW is found to have expired, the TOW reception mode is set (S1305). In the case where the time of week TOW has not expired, on the other hand, the controller 47 determines whether or not the leap second information and the week number WN are both valid (S1303). The controller 47 returns to the processing of S1301 when both are valid. In the case where at least one of the leap second information and the week number WN is found to have expired, on the other hand, the all reception mode is set (S1304).

The controller 47 next determines in the same manner described in the processing of S1106 whether or not conditions for activating the reception circuit 31 (a generated electricity amount condition and an activation count condition) are satisfied (S1306). In the case where the activation conditions are satisfied (S1307), the controller 47 connects the switch 56 and the reception circuit 31 is activated (S1308). In the case where the activation conditions are not satisfied (S1307), on the other hand, the controller 47 returns to S1301. Once the reception circuit 31 is activated, the switch 56 is kept switched on only for a period of time that is determined by the reception mode, the number of pieces of established reception target reference information, and the type of the established reception target reference information. The switch 56 is then switched off and satellite data of the period of time is received.

Thereafter, various types of post-reception processing are executed in the same manner as in the processing of S1109 (S1309). The controller 47 further determines whether or not some piece of reference information has been successfully obtained (S1310). In the case where some piece of reference information has been successfully obtained in S1308, the controller 47 returns to S1301. In the case where obtaining the reference information has failed, on the other hand, the controller 47 waits for a given period of time and then returns to S1301 (S1311).

In the manner described above, when obtaining the reference information fails, the generated electricity amount is not obtained and the reception circuit 31 is not activated for a given period of time. This increases occasions for charging the battery 26, and also avoids uselessly activating the reception circuit 31 successively when the reference information is not likely to be obtained.

Modification Example 9-3

Figure 34:
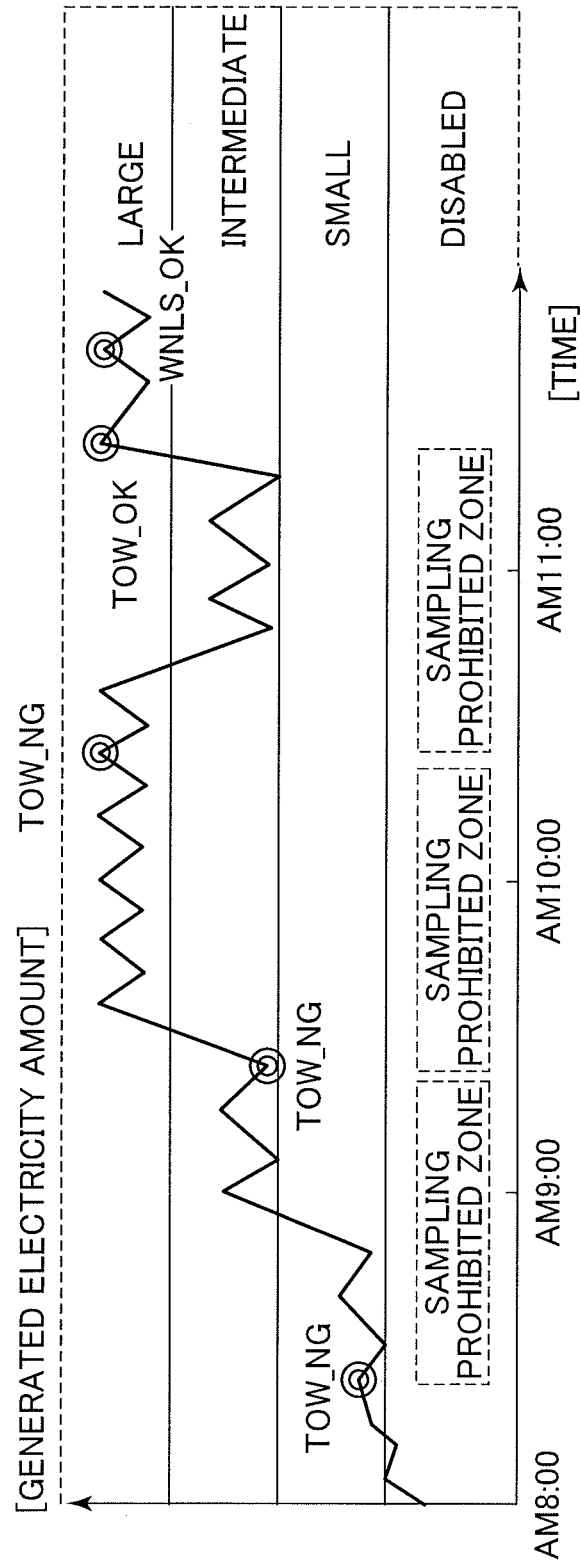
FIG. 34 A diagram illustrating Modification Example 3 of reference information reception timing.

As illustrated in FIG. 34, when obtaining the reference information fails, the controller 47 stands by while refraining from obtaining the generated electricity amount for a given period of time. After the given period of time elapses, the reception circuit 31 may be activated to start the reception operation only when the generated electricity amount is increased or the generated electricity amount is "large" upon arrival of a time for receiving page 18 of the sub-frame 4.

Figure 35:
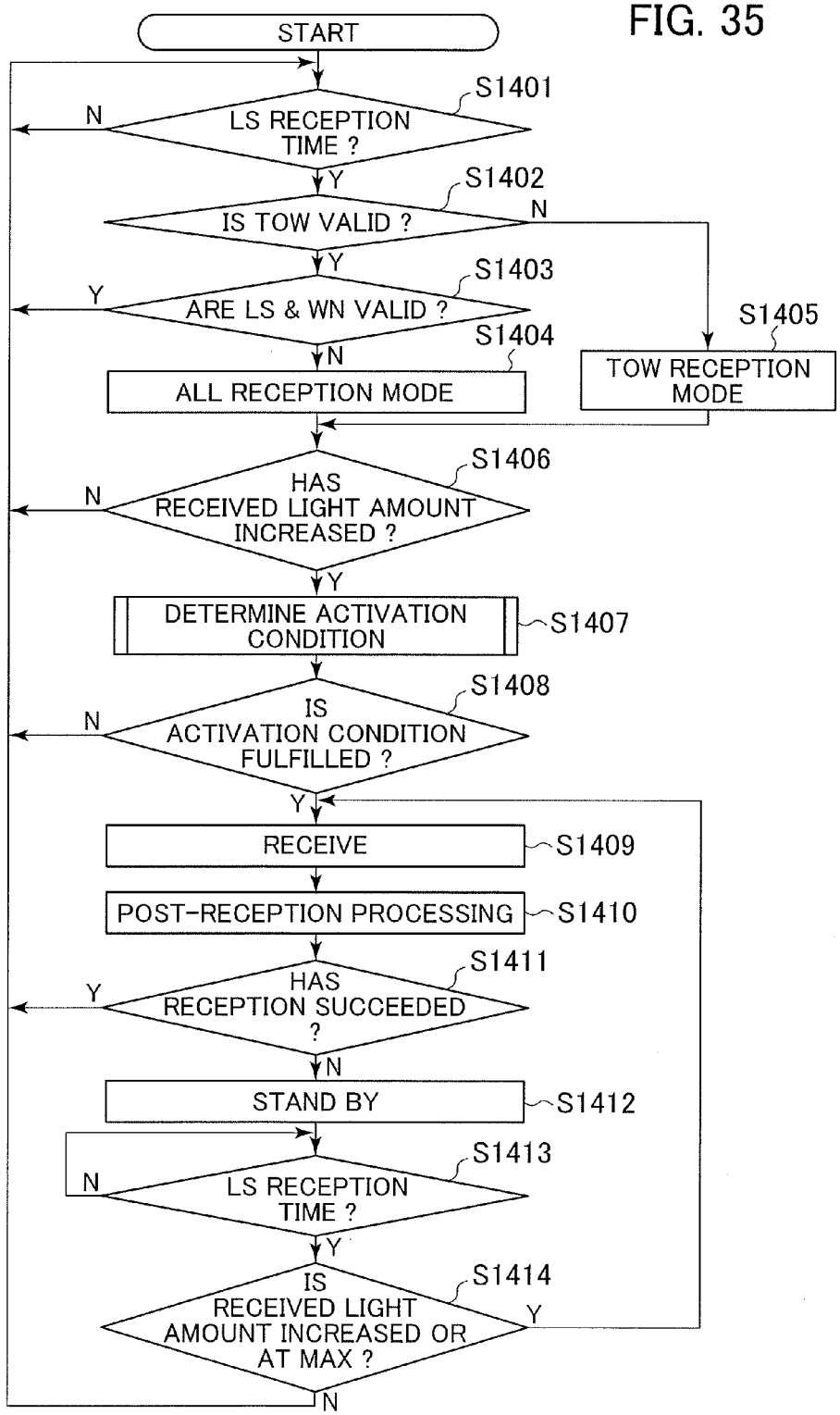
FIG. 35 A control flow chart of a receiving operation according to Modification Example 9-3.

FIG. 35 is a flow chart illustrating Modification Example 9-3 of the processing of activating the reception circuit 31 which is executed by the controller 47. As illustrated in FIG. 35, the controller 47 first waits for a time for receiving page 18 of the sub-frame 4 according to the internal time (S1401). When this time arrives, the controller 47 determines whether or not the time of week TOW is valid (S1402). In the case where at least one of the leap second information and the week number WN and the time of week TOW are found to have expired, the controller 47 sets the TOW reception mode (S1405). In the case where the time of week TOW has not expired, on the other hand, the controller 47 determines whether or not the leap second information and the week number WN are both valid (S1403). The controller 47 returns to the processing of S1401 when both are valid. In the case where at least one of the leap second information and the week number WN is found to have expired, on the other hand, the all reception mode is set (S1404).

The controller 47 next switches the switch 29 to obtain the amount of electricity generated by the solar battery 11, and determines whether or not the generated electricity amount has increased from the last time the generated electricity amount has been obtained (S1406). In the case where the generated electricity amount has not increased, the controller 47 returns to S1401. In the case where the generated electricity amount has increased, on the other hand, the controller 47 next determines in the same manner described in S1106 whether or not conditions for activating the reception circuit 31 (a generated electricity amount condition and an activation count condition) are satisfied (S1407). In the case where the activation conditions are satisfied (S1408), the controller 47 connects the switch 56 and activates the reception circuit 31 (S1409). In the case where the activation conditions are not satisfied (S1408), on the other hand, the controller 47 returns to S1401.

Once the reception circuit 31 is activated, the switch 56 is kept switched on only for a period of time that is determined by the reception mode, the number of pieces of established reception target reference information, and the type of the established reception target reference information. The switch 56 is then switched off and satellite data of the period of time is received. Thereafter, various types of post-reception processing are executed in the same manner as in the processing of S1109 (S1410). The controller 47 further determines whether or not some piece of reference information has been successfully obtained (S1411). In the case where some piece of reference information has been successfully obtained in S1409, the controller 47 returns to S1401.

In the case where obtaining the reference information has failed, on the other hand, the controller 47 stands by for a given period of time (S1412), and then waits for a time for receiving page 18 of the sub-frame 4 (S1413). When this time arrives, the controller 47 obtains the amount of electricity generated by the solar battery 11, and determines whether the generated electricity amount has increased from the last time the generated electricity amount has been obtained, or whether the generated electricity amount is "large" (S1414). When the answer to one of the two is yes, the controller 47 returns to the processing of S1409. In the case where the answer is no for both, the controller 47 returns to the processing of S1401.

In the manner as described above, when obtaining the reference information fails, the generated electricity amount is not obtained and the reception circuit 31 is not activated for a given period of time. This increases occasions for charging the battery 26, and also avoids uselessly activating the reception circuit 31 successively when the reference information is not likely to be obtained. Further, because the reception circuit 31 is activated only when the amount of electricity generated by the solar battery 11 increases or when the generated electricity amount is "large", repeatedly failing to obtain reference information is prevented.

The invention claimed is:

1. A satellite radio-controlled watch which adjusts time based on a satellite signal transmitted from a satellite, comprising:
   a receiver configured to receive the satellite signal;
   a solar battery;
   a generated electricity amount detecting unit configured to sequentially detect a received light amount of light received by the solar battery; and
   a controller configured to have functions of:
   calculating a received light variation which is an amount of change of the received light amount;
   judging whether the received light amount exceeds a first threshold which stands for that the satellite radio-controlled watch is outdoor or not;
   judging whether the received light variation exceeds a second threshold which stands for change in posture of the satellite radio-controlled watch; and
   controlling the receiver to start an operation of receiving the satellite signal in case that the received light amount is judged to exceed the first threshold and the received light variation is judged to exceed the second threshold.

2. The satellite radio-controlled watch according to claim 1, wherein the controller starts the receiving operation when the received light variation exceeds a given variation threshold.

3. The satellite radio-controlled watch according to claim 1, wherein the controller changes a time interval for obtaining the received light amount when the received light amount exceeds the first threshold.

4. The satellite radio-controlled watch according to claim 3, wherein the controller starts calculating the received light variation when the received light amount exceeds the first threshold.

5. The satellite radio-controlled watch according to claim 1, wherein the controller controls the receiver to start the receiving operation at least based on stability of the received light amount.

6. The satellite radio-controlled watch according to claim 5, wherein the controller controls the receiver to start the receiving operation when received light amounts, which are sequentially detected, satisfy a given condition more times in series than a given count threshold.

7. The satellite radio-controlled watch according to claim 6, wherein the controller varies the count threshold depending on whether a current time or a leap second offset should be obtained from the satellite signal.

8. The satellite radio-controlled watch according to claim 6,
wherein the controller controls the receiver to start the receiving operation when the received light amount exceeds a given threshold more times in series than the given count threshold, and
wherein the given count threshold is set to a different value depending on whether time information or leap second information should be obtained from the satellite signal.

9. The satellite radio-controlled watch according to claim 1,
wherein the receiver comprises a patch antenna having a reception surface, and
wherein the reception surface of the patch antenna and a light receiving surface of the solar panel are both directed toward a glass side, a direction in which the glass of the satellite radio-controlled watch is placed.

* * * * *